US008814752B2

(12) United States Patent
Kitaori et al.

(10) Patent No.: US 8,814,752 B2
(45) Date of Patent: Aug. 26, 2014

(54) SHIFT CONTROL DEVICE FOR VEHICLE

(75) Inventors: Ichiro Kitaori, Nagoya (JP); Takahiko Tsutsumi, Toyota (JP); Osamu Kanai, Toyota (JP); Koki Ueno, Toyota (JP); Keisuke Sekiya, Toyota (JP); Toshinari Suzuki, Aichi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/529,259

(22) Filed: Jun. 21, 2012

(65) Prior Publication Data

US 2012/0305360 A1 Dec. 6, 2012

Related U.S. Application Data

(63) Continuation-in-part of application No. PCT/JP2009/071349, filed on Dec. 22, 2009.

(51) Int. Cl.
*F16H 59/74* (2006.01)

(52) U.S. Cl.
USPC .......................................................... 477/99

(58) Field of Classification Search
USPC ........................................ 477/99; 192/219.4
See application file for complete search history.

(56) References Cited

U.S. PATENT DOCUMENTS

| 4,976,171 | A * | 12/1990 | Sharp et al. | 477/96 |
| 7,270,623 | B2 * | 9/2007 | Wang | 477/96 |
| 7,305,284 | B2 | 12/2007 | Teshima et al. | |
| 7,370,547 | B2 | 5/2008 | Amamiya et al. | |
| 7,549,351 | B2 | 6/2009 | Amamiya et al. | |
| 7,549,352 | B2 | 6/2009 | Amamiya et al. | |
| 2004/0110600 | A1 * | 6/2004 | Sekino et al. | 477/99 |
| 2004/0200301 | A1 * | 10/2004 | Amamiya et al. | 74/335 |
| 2008/0045381 | A1 * | 2/2008 | Vermeersch et al. | 477/99 |

FOREIGN PATENT DOCUMENTS

| DE | 10 2004 017 258 | 3/2005 |
| DE | 60 2004 008 755 | 6/2008 |
| JP | 2004-278756 | 10/2004 |
| JP | 2004-308752 | 11/2004 |

(Continued)

OTHER PUBLICATIONS

International Search Report in International Application No. PCT/JP2009/071349; Mailing Date: Feb. 9, 2010.

*Primary Examiner* — Troy Chambers
*Assistant Examiner* — Lillian Nguyen
(74) *Attorney, Agent, or Firm* — Finnegan, Henderson, Farabow, Garrett & Dunner LLP

(57) ABSTRACT

It is provided a shift control device for a vehicle having a parking lock device driven by an actuator to selectively switch switching positions between a lock position and an unlock position, wherein when a run-enable operation is made by a driver and a non-running state is switched to a running state, shift position recognizing control is executed for recognizing an initial switching position appearing at the beginning when the running state is established, by driving the actuator in response to switching position information indicative of the switching position on a stage before the running state is established, wherein: the non-running state is configured to be switched to the running state prior to the execution of the run-enable operation; and updating of the switching position information, stored in the switching position information storage device, is permitted to be executed subjected to the switching position recognizing control being executed.

4 Claims, 8 Drawing Sheets

(56) References Cited

FOREIGN PATENT DOCUMENTS

| JP | 2004-316840 | 11/2004 |
| JP | 2005-90575 | 4/2005 |
| JP | 2009-24826 | 2/2009 |
| JP | 2009-281519 | 12/2009 |

* cited by examiner

SHIFT CONTROL DEVICE FOR VEHICLE

CROSS-REFERENCE TO RELATED APPLICATIONS

This application is a continuation-in-part application of International Application No. PCT/JP2009/071349, filed Dec. 22, 2009, the content of which is incorporated herein by reference.

FIELD OF THE INVENTION

The present invention relates to a shift-by-wire technology for a vehicle having a parking lock device, configured to selectively switch switching positions into a lock position for restricting the rotations of wheels and an unlock position by driving an actuator, wherein, in particular, the shift positions of the vehicle are electrically switched in response to a request signal for switching the switching positions.

BACKGROUND ART

A shift control device for a vehicle has been known including a parking lock device for switching rotational teeth, rotatable with wheels, into a lock state for a lock tooth to mesh with the rotational teeth and an unlock state for the lock state to be released. To this end, a so-called shift-by-wire (SBW) system is employed for electrically switching shift positions, associated with the running of a vehicle, into the lock state and the unlock state by actuating an actuator provided with the parking lock device in response to a request signal. If an operated position in a shift operation device, operated by a driver, i.e., a shift position is a position for parking (parking position; P position), then, a control signal is output to the parking lock device for mechanically blocking the rotations of drive wheels. This results in actuation of the actuator of the parking lock device such that the rotations of the wheels are blocked. Such a shift control device for the vehicle is disclosed in, for instance, Patent Document 1.

The parking lock device which is caused to actuate by the shift control device disclosed in Patent Document 1 includes the actuator and an encoder. The parking lock device is configured to turn and reciprocate between the P position (parking position; lock position) in which the lock state is established and the non-P position (non-parking position; unlock position) in which the unlock state is established, in accordance with an operation of the actuator. In addition, the parking lock device has structural walls which may perform as stroke ends provided at the P position and the non-P position of the parking lock device, respectively.

The encoder is not of the type that detects an absolute position of the actuator but includes a rotational angle sensor that outputs pulses in conjunction with the rotation of the actuator. Accordingly, if a device power supply is interrupted due to the turn-off of an ignition switch or the like, the shift control device loses information on the absolute position of the actuator. If the power supply is turned on again, therefore, a need arises for recognizing whether an initial switching position of the parking lock device at an original power-on state of the power supply is in the P position or the non-P position.

In the shift control device disclosed in Patent Document 1, therefore, for instance, the switching position, appearing immediately before the power supply is interrupted, is stored in a non-volatile storage device to keep a memory such that information (switching position information) on the switching position in the P position or the non-P position is kept when the power supply is turned off. If the power supply is turned on again and the driver performs a run-enable operation to enable the vehicle to run such as turning on the vehicle power switch (ignition switch), then, the shift control device reads switching position information stored in the non-volatile storage device. In this moment, if the switching position, appearing immediately before the power supply is turned off last time, is in the P position, then, the shift control device allows the actuator to turn to the stroke end associated with the P position for executing P-wall position detecting control for recognizing the position of the stroke end (P wall) associated with the P position. If the switching position, appearing immediately before the power supply is turned off last time, is in the non-P position, then, the shift control device allows the actuator to turn to the stroke end associated with the non-P position for executing non-P wall position detecting control for recognizing the position of the stroke end (non-P wall) associated with the non-P position.

As set forth above, basically, an information about whether the switching position (switching position information) is in the P position or the non-P position is stored in the non-volatile storage device but it may occur that such switching position information does not indicate either the P position or the non-P position and indicates unknown (uncertain). For instance, if the shift control device is terminated in failure during the last turn-off of the power supply, the switching position information is stored to indicate unknown in the non-volatile storage device. If such switching position information indicates unknown in such a way, a vehicular control device, other than the shift control device, is configured to determine the switching position information based on a vehicle speed. This allows the shift control device to receive the switching position information, determined based on the vehicle speed, for executing the P wall position detecting control or the non-P wall position detecting control based on such switching position information. Accordingly, if shift position information, stored in the non-volatile storage device, is unclear, a need arises for the vehicular control device to take a further large number of steps, like those in which shift position information is determined based on the vehicle speed and received to the shift control device, in contrast to a case wherein shift position information indicates the P position or the non-P position. This results in a further increase in time required for the P wall position detecting control or the non-P wall position detecting control to be completed after the run-enable operation is executed. By so doing, the shift control device recognizes if such initial switching position is in the P position or the non-P position.

CITATION LIST

Patent Literature

Patent Document 1: Japanese Unexamined Patent Application Publication No. 2004-308752

SUMMARY OF INVENTION

Technical Problem

As set forth above, the P wall position detecting control or the non-P wall position detecting control is executed subject to the execution of the run-enable operation. Therefore, none of the P wall position detecting control and the non-P wall position detecting control is executed by the shift control device, disclosed in Patent Document 1, provided that the run-enable operation is executed even if the power supply is turned on. That is, it is likely that the power supply is turned off without causing the shift control device to recognize whether the initial switching position is in the P position or the non-P position even if the power supply is turned on. Such a likelihood is deemed to include, for instance: a case wherein a key collating (checking) function is provided to allow the vehicle to perform the collation of the ignition key and the shift control device is assigned to perform a whole or a part of such a key collating function; under which the shift control device is powered on by causing the vehicle to receive a wireless signal from the ignition key and, subsequently, the driver gets out of the vehicle with the ignition key with no action taken to turn on the ignition switch. Thus, under a situation where the power supply is turned off without causing the P wall position detecting control or the non-P wall position detecting control to be executed even if the shift control device is powered on, none of the P position and the non-P position is recognized by the shift control device disclosed in Patent Document 1 during the turning-off of the power supply. Further, no particular condition is fixed in the non-volatile storage device to store such shift position information. This causes the non-volatile storage device to store such shift position information to be uncertain in the shift position appearing immediately before the power supply is turned off. Then, this causes the shift control device to execute the P wall position detecting control or the non-P wall position detecting control, when the power supply is turned on at next time, on the assumption that shift position information, stored in the non-volatile storage device, is uncertain. This results in the occurrence of an issue causing an increase in time required for completing the P wall position detecting control or the non-P wall position detecting control from the execution of the run-enable operation regardless of such control being normally terminated at the preceding turn-off of the power supply. That is, this causes the shift control device to be impossible to switch the parking lock device into the P position or the non-P position in accordance with the driver's shift operation unless the shift control device recognizes whether the initial switching position of the parking lock device belongs to the P position or the non-P position. Thus, the vehicle cannot begin running even if the ignition switch is turned on. This results in the occurrence of the issue in which it takes long time required for the vehicle to be capable of beginning to run in response to the run-enable operation. In addition, such an issue is unknown.

The present invention has been completed with the above view in mind and has an object to provide a shift control device for a vehicle that can suppress the occurrence of an increase in time required for the vehicle begins to run when the run-enable operation has been executed.

Solution to Problem

For achieving an above object, a first aspect of the present invention provides a shift control device for a vehicle having a parking lock device driven by an actuator to selectively switch switching positions between a lock position for wheels to be restricted in rotation and an unlock position with no restriction in rotation of the wheels, wherein when a run-enable operation is made by a driver to enable the vehicle to run and a non-running state is switched to a running state, shift position recognizing control is executed for recognizing an initial switching position appearing at the beginning when the running state is established, by driving the actuator in response to switching position information indicative of the switching position preliminarily stored in a switching position information storage device on a stage before the running state is established, wherein the non-running state is configured to be switched to the running state prior to the execution of the run-enable operation, and updating of switching position information, stored in the switching position information storage device, is permitted to be executed subjected to the switching position recognizing control being executed.

Advantageous Effects of Invention

With the first aspect, when the shift control device is switched from the non-running state to the running state and switched again to the non-running state by, for example, turning off in normal practice without a run-enable operation made by the driver, switching position information, stored in the switching position information storage device, is not updated since being uncertain. In contrast to a case where switching position information is updated to be uncertain, therefore, in next time of switching of the shift control device to the running state, that is, when the run-enable operation is made while the shift control device is turned on in next time, it becomes possible to suppress the occurrence of an increase in time required for the vehicle to become ready to begin to run when the run-enabling operation is executed. As a result, the driver can comfortably begin the running of the vehicle without waiting time.

Preferably, when the shift control device is switched to the running state, the switching position information storage device stores the switching position information when the shift control device is switched from the running state to the non-running state last time. With such an operation, when the shift control device is set to the running state to recognize the initial switching position of the parking lock device, it becomes possible to further eliminate a probability of a discrepancy between switching position information, read from the switching position information storage device, and a real initial switching position of the parking lock device.

More preferably, the non-running state is switched to the running state for a key collating operation for an electronic key that performs wireless communication with the vehicle. This enables the shift control device to perform a whole of or a part of the key collating operation in charge. This enables a device to implement the key collating operation in structure, for instance, made of a less number of control devices at low cost than that in which no key collating operation is completed by the shift control device.

Further, preferably, the vehicle includes a vehicular power transmitting device provided in the power transmitting path extending from, for instance, a power source to drive wheels. Such a power source preferably includes, for instance, an internal combustion engine or the like such as a gasoline engine and a diesel engine, etc., for generating a power output by combusting fuels. In addition, other prime movers, such as electric motors, may be used singly or in combination with the engines. That is, the vehicle may include, for instance: an engine driven vehicle propelled by a power source composed of only the engine; an electric vehicle propelled by a power source composed of only an electric motor; a hybrid vehicle propelled by a power source composed of both the engine and the electric motor; a vehicle including a power source composed of a prime mover other than the engine and the electric motor; or a vehicle including more than three prime movers.

More preferably, the vehicular power transmitting device may include, for instance: only a transmission; a torque converter and a transmission having a plurality of speed ratios; or a reduction gear mechanism section and a differential gear mechanism section combined with such transmissions. The transmission may have structures of either one of structures described below. Firstly, the transmission includes a reduction gear unit such as a planetary gear unit or the like that is used in the electric vehicle in connection to the electric motor. The transmission may be a variety of planetary-gear type multi-step transmissions with for instance a forward drive four-speed gear positions, a forward drive five-speed gear positions, a forward drive six-speed gear positions and more gear positions. In these transmissions, rotary elements of plural sets of planetary gear devices are selectively coupled by engagement devices such that a plurality of gear positions (shift positions) is alternately established. The transmission may further be a synchronous mesh-type parallel two-shaft transmission including plural pairs of constant-mesh type change gears mounted on two shafts, in which either one of the plural pairs of change gears is alternately brought into a power transmitting state by the action of a synchronous device. The synchronous mesh-type parallel two-shaft transmission may include a hydraulic actuator to drive the synchronous device such that gear positions are automatically switched. The transmission may further include a so-called belt-drive type continuously variable transmission having a power transmitting belt serving as a power transmitting member, which is wound in tension between a pair of variable pulleys having variable effective diameters to vary speed ratios in a continuously variable fashion.

Secondly, the transmission may be a so-called traction type continuously variable transmission having a pair of cones arranged to rotate about a common axis, and plural pieces of rollers operative to rotate about a center of rotation intersecting the common axis. The rollers are pinched between the pair of cones, and an intersecting angle between the center of rotation of the rollers and the common axis is varied to vary the speed ratios.

Thirdly, the transmission may be an automatic transmission including a differential mechanism structured of for instance a planetary gear unit arranged to distribute a drive power from an engine to a first electric motor and an output shaft, a second electric motor mounted on the differential mechanism at an output shaft thereof. With such an automatic transmission, the differential mechanism has a differential action which mechanically transmits a main part of the drive power of the engine to drive wheels. The rest of the drive power from the engine is electrically transmitted through the first electric motor to a second electric motor in an electrical path, thereby electrically varying the speed ratios. In another alternative, the transmission may be an automatic transmission including an electric motor capable of transmitting a drive power to an engine shaft and an output shaft, which is installed on a so-called parallel shaft type hybrid vehicle.

More preferably, the parking lock device belongs to the lock position under the lock state causing the lock tooth to mesh with rotational teeth rotating with the wheels and the unlock position under the unlock state causing the lock state to be released. The rotational teeth may be fixed to, for instance, an output rotating member of the transmission connected to the wheels but may be fixed to other rotating members placed in a range directly connectable to the wheels.

BRIEF DESCRIPTION OF THE DRAWINGS

FIG. 1 is a view illustrating schematic structure of a power transmitting path between an engine and drive wheels in structure of a vehicle to which the present invention is applied and represents a block diagram for illustrating an essential part of a control system provided on the vehicle for controlling a parking lock device or the like.

DETAILED DESCRIPTION OF THE PREFERRED EMBODIMENTS

Now, an embodiment according to the present invention will be described below in detail with reference to the accompanying drawings.

Embodiment

Figure 1:
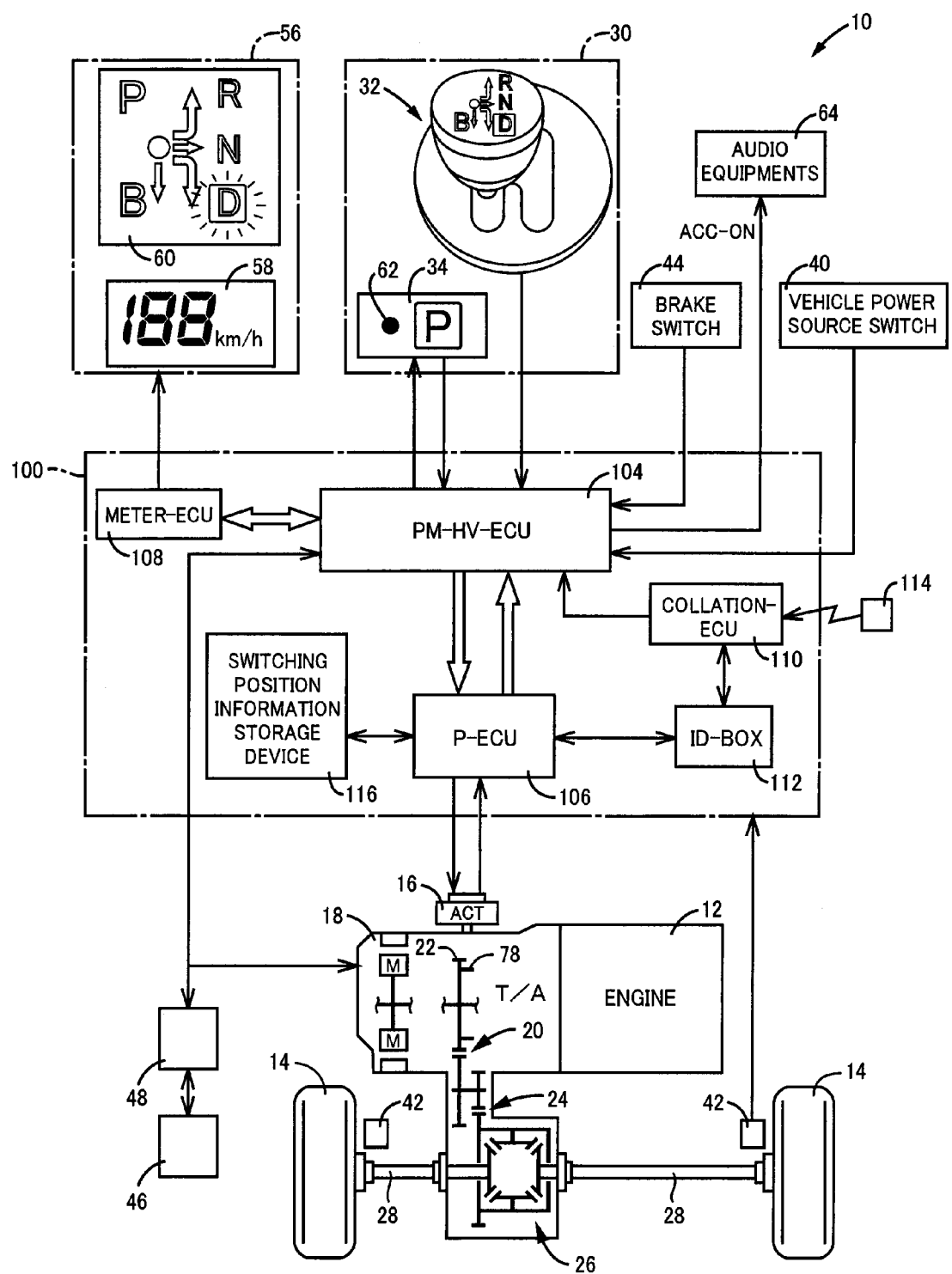

FIG. 1 is a view for illustrating schematic structure of a power transmitting path between an engine 12 and drive wheels 14 in structure of a vehicle 10 to which the present invention is applied and represents a block diagram for illustrating an essential part of a control system provided on the vehicle 10 for controlling a parking lock device 16 or the like. In FIG. 1, the vehicle 10 includes the parking lock device 16, a transmission 18, and a shift operation device 30, etc. and adopts a shift-by-wire (SBW) system for electrically switching shift positions related to the running of the vehicle 10, i.e., shift positions (shift ranges) of the transmission 18. Further, the transmission 18 is of the type that is preferably applied to, for instance, a FF (Front Engine Front Drive) vehicle to be transversely located in the vehicle 10. This allows power of the engine 12 in the form of an internal combustion engine playing a role as a running drive power source to be transmitted from an output gear 22 in the form of an output rotary member of the transmission 18, forming one of a counter gear pair 20, to a pair of drive wheels 14 in sequence. This is performed via the counter gear pair 20, a final gear pair 24, a differential gear device (a differential gear) 26 and a pair of axles (drive shaft (D/S)) 28, etc., by which the power transmitting device is formed. A trans axle (T/A) is formed by the transmission 18, the counter gear pair 20, the final gear pair 24, and the differential gear device (differential gear) 26, etc. Hereunder, description will be provided of an exemplary case with the present invention applied to a hybrid vehicle including a drive-force source comprised of an engine 12 and an electric motor M. However, the vehicle, to which the present invention is applied, may be vehicles of various types such as a usual engine-propelled vehicle, a hybrid vehicle and an electric vehicle, etc.

Further, the vehicle 10 is provided with an electronic control device 100 including a shift control device for a vehicle for controlling operating states, etc., of the parking lock device 16. The electronic control device 100 includes a so-called microcomputer composed of, for instance, CPU, RAM, ROM and input/output interfaces, etc. The CPU executes signal processing in accordance with programs preliminarily stored in ROM while utilizing a temporary storage function of RAM. This results in execution of a hybrid drive control such as an output control of the engine 12 and a drive control of the electric motor M, etc., a shift control of the transmission 18, a switching control of the shift positions of the transmission 18 with the use of the shift-by-wire system, and a switching control of the operating states of the parking lock device 16, etc.

The electronic control device 100 is applied with various signals including: positional signals of a shift lever delivered from a shift sensor 36 and a select sensor (see FIG. 2) 38, acting as position sensors for detecting an operated position (shift position) $P_{SH}$ of for instance the shift lever 32, depending on the operated position $P_{SH}$ of the shift lever 32; a P-switching signal representing a switching operation of a P-switch 34 operable by a user for switching the shift position of the transmission 18 from non-P-positions except the P-position to a parking position (P position); a P position signal representing an operating state of a parking lock (P-lock) in the parking lock device 16, actuated when the parking lock (P-lock) is operated or released, for switching the shift position of the transmission 18 between the P-position and the non-P-positions; power switch signals representing switching operations of a vehicle power source switch 40 for switching the switching position of the power supply of the vehicle 10 when operated by a user; wheel speed pulse signals corresponding to vehicle speeds V representing rotational speeds $N_w$ of the respective wheels (drive wheels 14 and idler wheels) delivered from wheel speed sensors 42 acting as the rotational speed sensors; a brake operation signal, indicating an on-brake state $B_{ON}$ delivered from a brake switch 44 representing that a foot brake pedal (not shown) is operated for detecting whether a service brake is operated; a signal indicating a charged current or a discharged current $I_{CD}$ of an electric-energy storage device 46; a signal indicating a voltage $V_{BAT}$ of the electric-energy storage device 46; and a signal indicating a state of charge (remains of charge) SOC of the electric-energy storage device 46, etc.

Further, the electronic control device 100 provides output signals including: hybrid control command signals such as, for instance, an engine output control command signal for output control of the engine 12, a motor control command signal for drive control of an electric motor M placed inside the transmission 18, and a shift control command signal for shift controls of the transmission 18, etc.; a shift position switching control command signal for switching the shift position of the transmission 18; a vehicle speed display control command signal for displaying a current vehicle speed V, by actuation of a speed meter 58 mounted inside a known combination meter 56 which performs as a display device for the user to indicate vehicle information related to the running of the vehicle; a shift position display control command signal for displaying a switching state on the shift position of the transmission 18 by actuation of a shift position indicator (shift position display device) 60 mounted inside the combination meter 56; a parking lock display control command signal (P-lock display control command signal) for displaying a P-lock state by actuation of a P position indicator lamp 62 playing a role as a lock display lamp for expressly indicating that the P-lock is under operation (parking lock state, P-lock state), i.e., that the shift position is placed in the P position, by light-up; and a P-switching control command signal for performing switching control of the parking lock device 16, etc. In addition, the P position indicator lamp 62 is a display lamp that is operative in a non-interlocking relation to the operations (light-up/light-out) of the combination meter 56 and is provided on, for instance, a P-switch 34.

More particularly, the electronic control device 100 includes a power-source control and hybrid control computer (hereinafter referred to as a "PM-HV-ECU") 104, a parking control computer (hereinafter referred to as "P-ECU") 106, a meter control computer (hereinafter referred to as "METER-ECU") 108, a key-collating computer (hereinafter referred to as "COLLATION-ECU") 110 and an ID-BOX 112, etc. Furthermore, the P-ECU 106 corresponds to the shift control device of the present invention.

The PM-HV-ECU 104 switches a switching state of the vehicle power supply for instance in response to a power switching signal delivered from the vehicle power source switch 40 operated by the user. In the illustrated embodiment, the switching state of the power supply of the vehicle 10 can be transient to any one of: for instance, a power-off state (ALL-OFF state and IG/ACC-OFF state) for disenabling the running of the vehicle; a partial power-on state (ACC-ON state and IG-OFF state) in which limited functions in part of the vehicle 10 are enabled with the combination meter 56 remained power-off although running of the vehicle is not enabled; and a power-on state (IG-ON state) for enabling the running of the vehicle with the combination meter 56 turned on. The limited functions correspond to, for instance, turning on a navigator and audio equipments 64 for operations thereof; and supplying to a power outlet socket (not shown) from batteries, etc. Moreover, the IG-ON state represents a state under which the running of the vehicle can be controlled in response to the hybrid control command signals related to, for instance, the running of the vehicle and include: a running enable state (READY-ON state) enabling the vehicle 10 to start up and run at time of accel-on; and, unless otherwise specified, the IG-ON state includes a state in which other functions than those of controlling the running of the vehicle in response to the hybrid control command signals is enabled (such as a state, for instance, in which switching controls of the shift positions of the transmission 18 can be performed) as well as engine 12 is not started up and the electric motor M cannot be driven, i.e., the vehicle 10 cannot start up and run even at time of accel-on.

For instance, upon detecting the input of the power switch signal under the brake-on state $B_{ON}$ when placed in the P position, the PM-HV-ECU 104 allows the switching state of the power supply of the vehicle 10 to be switched from any one of the states to the IG-ON state (only the READY-ON state). Further, upon detecting the vehicle speed V in a value less than a predetermined vehicle halt speed V' and the power switch signal being input when placed in the P position, the PM-HV-ECU 104 allows the switching state of the power supply of the vehicle 10 to be switched to the ALL-OFF state.

Furthermore, upon detecting the power switch signal being input in the absence of the BRAKE-ON state $B_{ON}$ when placed in the P position, the PM-HV-ECU 104 allows the switching state of the power supply of the vehicle 10 to be switched into the ALL-OFF state→ACC-ON state→IG-ON state (exclusive of the READY-ON state)→ALL-OFF state→ . . . in such an order each time the power switch signal is input. Moreover, upon detecting the presence of the BRAKE-ON state $B_{ON}$ and the input of the power switch signal under the ACC-ON state or the IG-ON state (exclusive of the READY-ON state) when placed in the non-P position, the PM-HV-ECU 104 allows the switching state of the power supply of the vehicle 10 to be switched to the IG-ON state (only the READY-ON state). In addition, upon detecting the vehicle speed V in a value less than the predetermined vehicle halt speed V' and the power switch signal being input when placed in the non-P position, the PM-HV-ECU 104 output an auto P-lock switching request signal to the P-ECU 106 for causing the shift position to be automatically shifted to the P position by actuating the parking lock device 16. Further, the PM-HV-ECU 104 allows the switching state of the power supply of the vehicle 10 to be switched to the ALL-OFF state after the P position has been established (a series of these operations being referred to as "auto-P-operation"). Further, upon detecting the absence of the BRAKE-ON state $B_{ON}$ and the input of the power switch signal under the ACC-ON state when placed in the non-P position, the PM-HV-ECU 104 allows the switching state of the power supply of the vehicle 10 to be switched to the IG-ON state (exclusive of the READY-ON state). The predetermined vehicle halt speed V' represents, for instance, a vehicle halt determining vehicle speed, obtained experimentally and stored, for determining a vehicle halt state is present. Furthermore, the PM-HV-ECU 104 cancels the operation of the vehicle power source switch 40 during the running of the vehicle, i.e., nullifies the power switch signal delivered from the vehicle power source switch 40.

The PM-HV-ECU 104 for instance performs an overall control of an operation of the transmission 18. When the switching state of the power supply of the vehicle 10 is switched to the IG-ON state (only the READY-ON state), the PM-HV-ECU 104 starts up a hybrid system for enabling the running of the vehicle, and outputs hybrid control commands, associated with the running of the vehicle, to the engine 12, the electric motor M and the transmission 18 for control of the running of the vehicle. Moreover, the PM-HV-ECU 104 outputs a shift position switching control command in response to the positional signals of the shift lever, depending on the operated position $P_{SH}$ delivered from the shift sensor 36 and the select sensor 38 to the transmission 18 for thereby switching the shift positions. In this instance, if the shift position of the transmission 18 belongs to the P position, the PM-HV-ECU 104 outputs a P-release switching request signal for causing the shift position of the transmission 18 to be switched from the P position to the non-P position in response to the positional signal of the shift lever, to the P-ECU 106. Further, the PM-HV-ECU 104 outputs a P-lock switching request signal for causing the shift position of the transmission 18 to be switched from the non-P position to the P position in response to the P-switching signal received from the P-switch 34, to the P-ECU 106. Furthermore, the PM-HV-ECU 104 outputs a shift position display signal for display of a state of the shift position to the METER-ECU 108. Moreover, the PM-HV-ECU 104 outputs a parking lock display control command signal (P-lock display control command signal) for the presence of the P-lock state (P position) to be displayed in response to the P-lock state signal delivered from the P-ECU 106 and representing the presence of the P position, to the P-switch 34. This causes the P position indicator lamp 62 to turn on in the P-switch 34, thereby clearly showing the presence of the P-lock state.

Here, the electric-energy storage device 46, composed of a direct current power supply that can be charged and discharged, includes, for instance, a secondary battery such as a nickel metal hydride and lithium-ion battery or the like. For instance, during the running of the vehicle under acceleration or during the running of the vehicle propelled by a motor stored electric power is supplied to the electric motor M via the inverter 48. During regenerative braking with the vehicle running in deceleration, electric power, generated by the electric motor M, is stored in the electric-energy storage device 46 via the inverter 48.

For switching the shift position between the P-position and the non-P-position in response to the auto-P-lock switching request signal and P-switching request signal (the P-lock switching request signal and the P-release switching request signal) delivered from for instance the PM-HV-ECU 104, the P-ECU 106 controllably drives the parking lock device 16 for operating or releasing the parking lock. Further, the P-ECU 106 determines in response to the P position signal delivered from the parking lock device 16 and representing an activated state of the parking lock, as to whether the shift position of the transmission 18 belongs to the P position or the non-P position. The determined result is output as a P-lock state signal to the PM-HV-ECU 104 or the like.

When the switching state of the power supply of the vehicle 10 is switched from the ALL-OFF state and the ACC-ON state to the IG-ON state, as described later, the P-ECU 106 executes initial drive control for the parking lock device 16 and performs controls to detect the P-wall position and the non-P wall position for the P position signal and the non-P position signal to be properly obtained. Before executing a series of initial controls for the parking lock device 16 when the switching state of the power supply of the vehicle 10 is switched from the ALL-OFF state and the ACC-ON state to the IG-ON state, further, the P-ECU 106 executes initial processing for the P-ECU 106 per se. Moreover, the P-ECU 106 is placed in a non-running state when the switching state of the power supply of the vehicle 10 belongs to the ALL-OFF state or the ACC-ON state and placed in a running state when the switching state of the power supply of the vehicle 10 belongs to the IG-ON state. However, if the key-collating operation for the electronic key 114 is executed, the running state is established even if the switching state of the power supply of the vehicle 10 belongs to the ALL-OFF state or the ACC-ON state. This will be described below. The non-running state of the P-ECU 106 may refer to, for instance, a state under which no power is supplied to the P-ECU 106 and the running state of the P-ECU 106 may refer to a state under which the P-ECU 106 is powered on.

The switching position information storage device 116 stores switching position information representing the switching position of the parking lock device 16. This switching position information is stored in the P-ECU 106 and updated. In addition, the switching position information storage device 116, composed of SRAM or the like that is supplied with electric power at all times, holds the switching position information even if the P-ECU 106 belongs to the non-running state.

The METER-ECU 108 outputs the vehicle speed display control command signal to the speed meter 58 mounted in the combination meter 56 for displaying a current vehicle speed, thereby providing a display of a current vehicle speed V. For instance, the METER-ECU 108 determines a meter display vehicle speed signal V by counting rectangular waves of a vehicle speed pulse signal in response to the vehicle wheel speed pulse signal output from the vehicle wheel speed sensor 42. Then, the METER-ECU 108 activates the speed meter 58 in response to the determined meter display vehicle speed signal V such that relevant segments are turned on to display the current vehicle speed V. Further, the METER-ECU 108 outputs the shift position display control command signal for displaying the state of the shift position in response to the shift position display signal output from the PM-HV-ECU 104, to the shift position indicator 60 mounted in the combination meter 56 such that a state of a current shift position is displayed over the shift position indicator 60. For instance, this causes a relevant display position of the shift position, placed on the shift position indicator 60, to be turned on.

The COLLATION-ECU 110 executes the key-collating operation for the electronic key 114, serving as an ignition key, in conjunction with the P-ECU 106 to perform wireless communication with the vehicle in relation to a certification code, for avoiding steal of the vehicle. More particularly, the COLLATION-ECU 110 performs ID-collation in wireless communication with the electronic key 114. For instance, if the electronic key 114 is detected within a detectable range of the electronic key 114 including whole of a vehicle compartment and areas around doors or trunk circumferences outside the vehicle, etc., the COLLATION-ECU 110 performs first code-collation for collating the certification code of the electronic key 114 with the ID-BOX 112. Concurrently, the P-ECU 106 executes communication with the ID-BOX 112 performing second code-collation for determining whether the ID-BOX 112 is normalized one mounted on the vehicle 10 in nature or not. The first code-collation and the second code-collation may refer to the key collating operations mentioned above. For instance, subsequent operation of the vehicle power source switch 40 is rendered effective subjected to acceptance of such first code-collation and second code-collation. With the electronic key 114 being detected within the detectable range, accordingly, the P-ECU 106, the COLLATION-ECU 110 and the ID-BOX 112 are effectuated in the running state even if the switching state of the power supply of the vehicle 10 belongs to the ALL-OFF state or the ACC-ON state. That is, the P-ECU 106, the COLLATION-ECU 110 and the ID-BOX 112, forming a device by which the non-running state is switched to the running state for the key collating operation, can be switched from the non-running state to the running state prior to performing run-enable operation such as operation to push the vehicle power source switch 40 effectuated by a driver (user) for causing the vehicle 10 to be placed in the run-enable state (READY-ON state).

Figure 2:
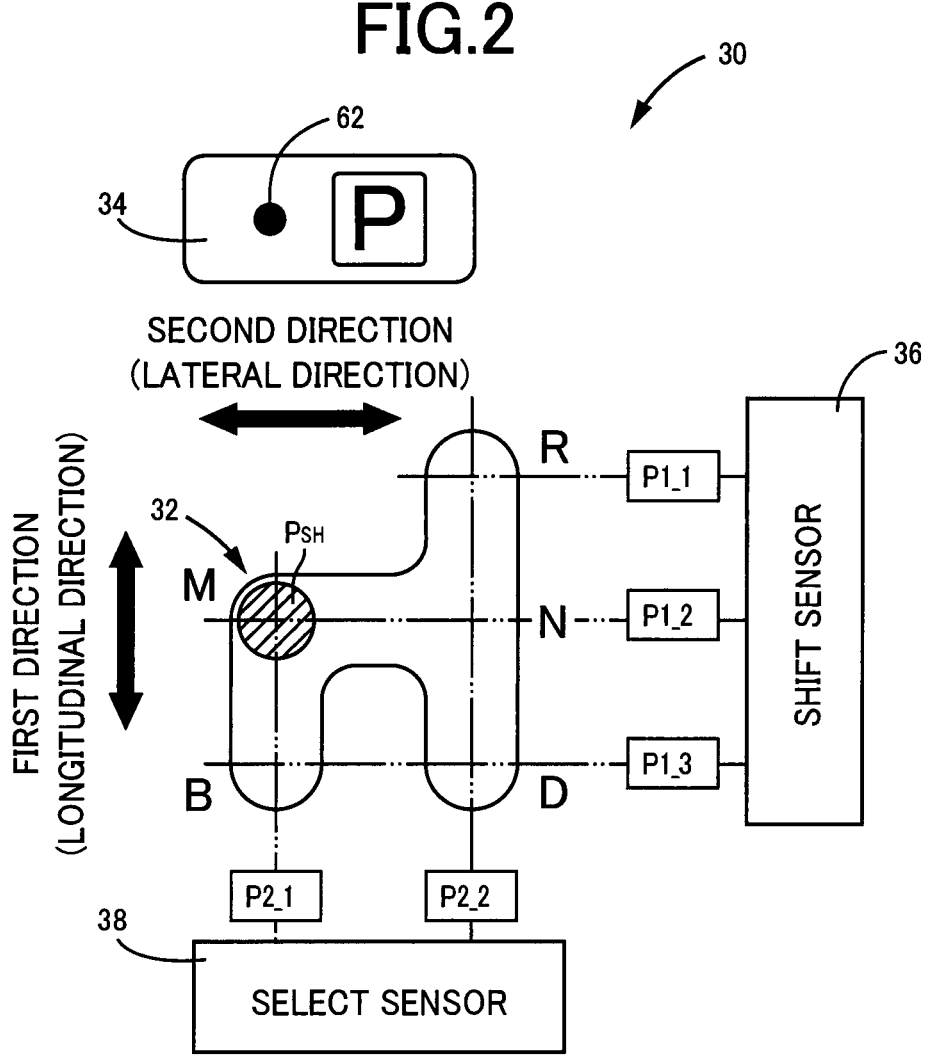
FIG. 2 is a graph showing one example of a shift operation device in the form of a switching device (operation device) arranged to switch a plural kinds of shift positions in a transmission provided with the vehicle shown in FIG. 1 by a manual operation.

FIG. 2 is a view illustrating one example of the shift operation device 30 acting as a switching device (operation device) for switching plural kinds of shift positions in the transmission 18 by a manual operation. The shift operation device 30, mounted in an area close proximity to for instance a driver's seat, includes a shifting lever 32 structured in the form of a momentary type operatively movable to a plurality of operated positions $P_{SH}$, i.e., an automatic return type as the operating lever automatically returned to an original position (initial position) with release of the operating force. Further, the shift operation device 30 of the present embodiment includes a P-switch 34, mounted as an independent switch in an area close proximity to the shift lever 32, to serve as a momentary type operating element for switching the shift position of the transmission 18 to the parking position (P-position) for the parking lock.

The shift lever 32 has an arrangement to be operable to three operated positions $P_{SH}$, arranged in a fore and aft direction or a vertical direction, i.e., a longitudinal direction of the vehicle as shown in FIG. 2, which includes a operated position "R" (R-operated-position), a operated position "N" (N-operated-position) and a operated position "D" (D-operated-position), and a operated position "M" (M-operated-position) and a operated position "B" (B-operated-position) arrayed in parallel to a layout of the former three positions. Thus, the positional signal of the shift lever is output to the PM-HV-ECU 104 depending on the operated positions $P_{SH}$. Further, the shift lever 32 can be operated in the longitudinal direction to one of the R-operated-position, the N-operated-position and the D-operated-position, can be operated in the longitudinal direction between the M-operated-position and the B-operated-position, and can be operated in a lateral direction of the vehicle intersecting the longitudinal direction thereof to have one of the N-operated-position and the B-operated-position.

The P-switch 34 is for instance a momentary type pushbutton switch, which outputs the P-switching signal to the PM-HV-ECU 104 in each depression by the user. If the P-switch 34 is depressed with the shift position of the transmission 18 switched in for instance the non-P-position, the P-ECU 106 causes the shift position to switch to the P-position in response to a P-lock switching request signal delivered from the PM-HV-ECU 104, provided that a predetermined condition such as the vehicle speed V is less that a P-lock permitting vehicle speed Vp is satisfied. The P-position represents a parking position in which the parking lock is performed by a power transmitting path being interrupted in the transmission 18 and the parking lock device 16 mechanically blocks the drive wheels 14 from rotating. The P-switch 34 incorporates therein a P position indicator lamp 62 that is turned on by the PM-HV-ECU 104 if the P-lock state signal, delivered from the P-ECU 106, represents the P position being involved.

The M-operated-position of the shift operation device 30 represents an initial position (home position) of the shift lever 32. Even if the shift lever 32 is shifted to the operated positions $P_{SH}$ (the operated positions "R", "N", "D" and "B") other than the M-operated-position, it is returned to the M-operated-position by the action of a mechanical mechanism such as a spring or the like, when the user releases the shift lever 32, i.e., when an external force, acting on the shift lever 32, is removed. With the shift operation device 30 operatively shifted to each operated position $P_{SH}$, the PM-HV-ECU 104 allows the shift position to be switched to a shift position associated with the operated position $P_{SH}$ subsequent to the shift operation in response to the operated position $P_{SH}$ (positional signal). In addition, the shift position indicator 60 displays the current operated position $P_{SH}$, i.e., a state of the shift position in the transmission 18.

Description will be provided of the respective shift positions. The R-position, selected when the shift lever 32 is operated to the operated position "R", represents a reverse-drive running position in which a drive force is transmitted to the drive wheels 14 to drive the vehicle in a reverse direction. Further, the neutral position (N-position), selected when the shift lever 32 is operated to the operated position "N", represents a neutral position to establish a neutral state under which the power transmitted path is interrupted in the transmission 18. Furthermore, the D-position, selected when the shift lever 32 is operated to the operated position "D", represents a forward-drive running position in which a drive force is transmitted to the drive wheels 14 to drive the vehicle in a forward direction. If the shift position is switched to for instance the P-position, the PM-HV-ECU 104 determines that the shift operation is executed to a predetermined operated position $P_{SH}$ (particularly, the operated position "R", the operated position "N" or the operated position "D") for releasing a halted movement (in a parking lock) of the vehicle in response to the positional signal of the shift lever. Then, if a predetermined condition, like the presence of the BRAKE-ON state $B_{ON}$, is satisfied, the P-release switching request signal is output to the P-ECU 106 for releasing the parking lock. A P-switching control command signal is output from the P-ECU 106 to the parking lock device 16 in response to the P-release switching request signal delivered from the PM-HV-ECU 104 for releasing the parking lock. Then, the PM-HV-ECU 104 allows the shift position to be switched to a shift position associated with the operated position $P_{SH}$ subsequent to such a shift operation.

Further, the B-position, selected when the shift lever 32 is operated to the operated position "B", represents a reduced-speed forward-drive running position (engine braking range), for instance by regenerative braking causing the electric motor M to generate regenerative torque in the D-position, to provide an engine braking effect for reducing rotation of the drive wheels. Accordingly, even if the shift lever 32 is operatively shifted to the operated position "B" from the current shift position other than the D-position, the PM-HV-ECU 104 causes such a shift operation to be ineffective. The shift operation to the operated position "B" is caused effective only when in the current shift position is the D-position. For instance, even if the driver performs the shift operation to the operated position "B" from the P-position, the shift position is remained in the P-position.

In the shift operation device 30 of the present embodiment, the shift lever 32 is returned to the operated position "M" in the removal of an external force acting thereon. Thus, a mere visual contact with the operated position $P_{SH}$ of the shift lever 32 can not recognize the shift position being selected. Therefore, the shift position indicator 60 is located in a position to be easily visible for the driver to display such information inclusive of the shift position being selected in the P-position.

The shift operation device 30 of the present embodiment adopts the so-called shift-by-wire (SBW) to be operated in two-dimensional directions including the first direction P1 aligned in the longitudinal direction, and the second direction P2 in line with the lateral direction intersecting with (orthogonal to in FIG. 2) the first direction. Accordingly, for the operated position $P_{SH}$ to be output to the electronic control device 100 as a detection signal of the position sensor, there are provided the shift sensor 36 acting as a first detecting section for detecting the shift operation in the first direction P1, and the select sensor 38 acting as a second detecting section for detecting the shift operation in the second direction P2. Voltages as the detection signals (positional signals) are output from both of the shift sensor 36 and the select sensor 38 to the electronic control device 100 depending on the operated position $P_{SH}$. Then, the electronic control device 100 recognizes (determines) the operated position $P_{SH}$ based on such detection signal voltages. That is, it can be said that the first detecting section (shift sensor 36) and the second detecting section (select sensor 38) form a operated position detecting section as a whole to detect the operated position $P_{SH}$ of the shift operation device 30.

An example of recognition of the operated position $P_{SH}$ is described below. A detection signal voltage $V_{SF}$ which is detected by the shift sensor 36 takes various voltages belonging to voltage levels (e.g. respective voltages falling in low, mid or high ranges) corresponding to respective positions including the first direction first position P1_1 indicating the operated position "R", the first direction second position P1_2 indicating the operated position "M" or "N", and the first direction third position P1_3 indicating the operated position "B" or "D". Further, the select sensor 38 provides a detection signal voltage $V_{SL}$. A detection signal voltage $V_{SL}$ takes various voltages belonging to voltage levels (e.g. respective voltages falling in low or high ranges) corresponding to respective positions including the second direction first position P2_1 indicating the operated position "M" or "B", and the second direction second position P2_2 indicating the operated position "R", "N" or "D". Upon detecting the detection signal voltages $V_{SF}$ and $V_{SL}$, the PM-HV-ECU 104 recognizes the operated positions $P_{SH}$ (the operated positions "R", "N", "D", "M" and "B") by combinations of respective voltage levels.

Figure 3:
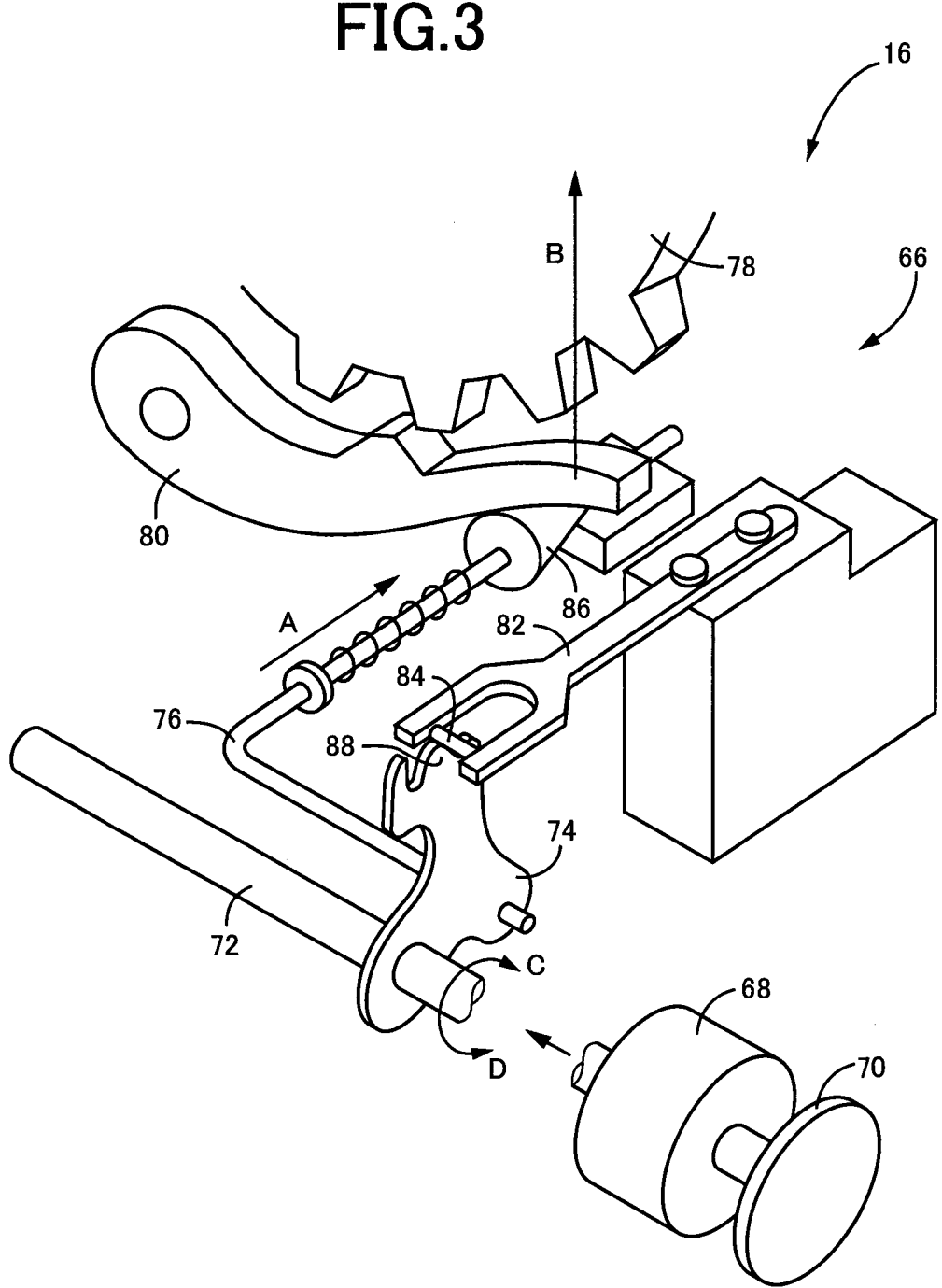
FIG. 3 is a view illustrating a structure of a parking lock device arranged to mechanically block the rotations of drive wheels in the vehicle shown in FIG. 1.

FIG. 3 is a view illustrating a structure of the parking lock device 16 arranged to mechanically block the drive wheels 14 from rotating. In FIG. 3, the parking lock device 16 includes a P-lock mechanism 66 (parking lock mechanism), a P-lock drive motor 68 (parking lock drive motor) being an electric actuator and an encoder 70, etc., and operates to block the movement of the vehicle in response to a control signal delivered from the electronic control device 100.

The P-lock drive motor 68 is an actuator of the present invention constituted of for instance a switched reluctance motor (SR motor) to drive the P-lock mechanism 66 with a shift-by-wire system upon receipt of a command (control signal) from the P-ECU 106. The encoder 70 is a rotary encoder, arranged to output signals in phases "A", "B" and "Z", which unitarily rotates with the P-lock drive motor 68 for detecting a rotary state of the SR motor. Thus, the encoder 70 supplies the P-ECU 106 with a signal representing such a rotary state, i.e., a pulse signal for acquiring a count value (encoder count) depending on displacement amount (rotated amount) of the P-lock drive motor 68. Upon receipt of such a signal supplied from the encoder 70, the P-ECU 106 grasps the rotary state of the SR motor for performing a power distribution control thereto.

The P-lock mechanism 66 includes: a shaft 72 drivably rotated with the P-lock drive motor 68; a detent plate 74 rotatable with the shaft 72 in rotation thereof; a rod 76 operable with the detent plate 74 in rotation thereof; a parking gear 78 rotatable in conjunction with the drive wheels 14; a parking lock pole 80 operative to block (lock) the rotation of the parking gear 78; a detent spring 82 operative to limit the rotation of the detent plate 74 for the shift position to be fixedly secured; and a roller or skid 84. A disposing position of the parking gear 78 is not limited as long as locking of the parking gear 78 locks the drive wheels 14. The parking gear 78 is fixed on for instance concentrically with the output gear 22 of the transmission 18 (see FIG. 1).

The detent plate 74 is operatively connected to a drive shaft of the P-lock drive motor 68 via the shaft 72, and is driven by the P-lock drive motor 68 together with the rod 76, the detent spring 82 and the roller 84, etc. The detent plate 74 functions as a parking lock positioning member to switch a parking lock position associated with the P-position, and a non-parking lock position associated with the respective shift positions (non-P positions) other than the P-position. The shaft 72, the detent plate 74, the rod 76, the detent spring 82 and the roller 84 operate a parking lock switching mechanism.

FIG. 3 shows a state under which the non-parking lock position is established, that is, the shift position belongs to the non-P position. Under such a state, since no parking lock pole 80 locks the parking gear 78, no P-lock mechanism 66 blocks the drive wheels 14 from rotating. Under such a state, rotating the shaft 72 in a direction as indicated by an arrow C in FIG. 3 by the P-lock drive motor 68 pushes the rod 76 in a direction as indicated by an arrow A in FIG. 3 via the detent plate 74.

This causes a taper member 86 mounted on the rod 76 at a distal end thereof to push up the parking lock pole 80 in a direction as indicated by an arrow B in FIG. 3. As the detent plate 74 is rotated, the roller 84 of the detent spring 82 placed in one of two valleys, i.e., a non-parking lock position 90 (hereinafter referred to as a "non-P position 90" (see FIG. 4)) formed on the detent plate 74 at a top thereof, is caused to ride over a ridge 88 into the other one of the valleys, i.e., a parking lock position 92 (hereinafter referred to as a "P position 92" (see FIG. 4)). The roller 84 is provided on the detent spring 82 to be rotatable about its center axis. When the detent plate 74 is rotated until the roller 84 reaches the P position 92, the parking lock pole 80 is pushed up to a position engageable with the parking gear 78. This mechanically blocks the drive wheels 14 from rotating in conjunction with the parking gear 78, so that the shift position is switched to the P-position. In the parking lock device 16, during the operation to switch the shift position between the P position and the non-P position, for lessening loads exerted on the components of the P-lock mechanism 66 such as the detent plate 74, the detent spring 82 and the shaft 72, for instance, the P-ECU 106 controls a rotational amount of the P-lock drive motor 68 so as to lessen an impact occurring when the roller 84 of the detent spring 82 passes across the ridge 88 and drops. With the parking lock device 16, it can be said that the switching position in which the roller 84 belongs to the P position 92 is a lock position (P position) under which the drive wheels (wheels) 14 are restrained in rotation and that the switching position in which the roller 84 belongs to the non-P position 90 is an unlock position (non-P position) under which none of the drive wheels (wheels) 14 is restrained in rotation.

Thus, due to the operation of the P-lock drive motor 68 driven in response to the command from the P-ECU 106, the switching position of the parking lock device 16 can be selectively switched between the lock position and the unlock position. In other words, the parking lock device 16 switches the parking gear 78, acting as a rotational gear rotatable with the wheels (drive wheels 14), in response to the operation made by the driver, between the lock state (P-lock state), causing a parking lock pole 80, acting as a lock teeth, to mesh with the parking gear 78 and the unlock state (non-P lock state) under which the preceding lock state is cancelled.

Figure 4:
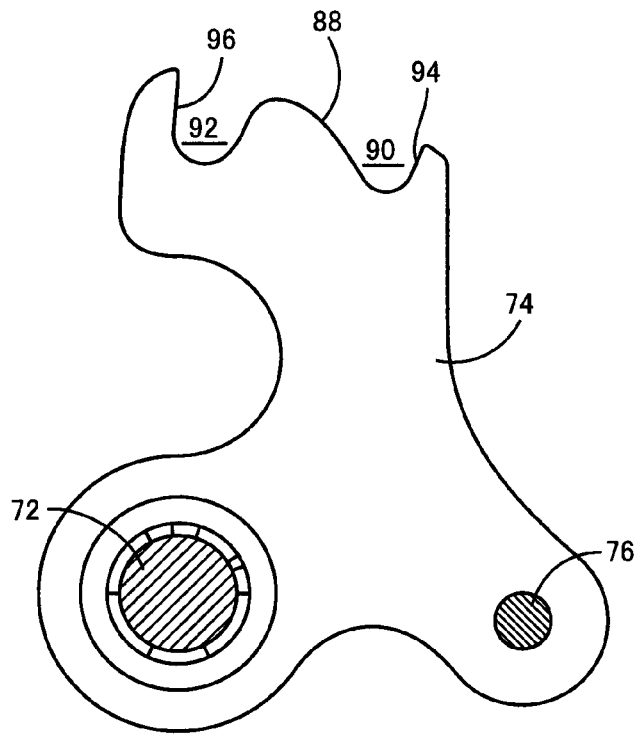
FIG. 4 is a view illustrating a structure of a detent plate provided with the vehicle shown in FIG. 1.

FIG. 4 is a view illustrating a structure of a detent plate 74. The detent plate 74 has valleys formed with surfaces distanced away from the ridge 88 which will be referred to as "walls". That is, the walls are present at positions in abutting contact with the roller 84 of the detent spring 82 crossing over the ridge 88 and drops onto bottoms of the valleys, when the control described below is not executed by the P-ECU 106. The wall relevant to the P position 92 is referred to as a "P wall" and the wall relevant to the non-P position 90 is referred to as a "non-P wall". When the roller 84 moves away from the P position 92 to the non-P position 90, the P-ECU 106 controls the P-lock drive motor 68 such that the non-P position wall 94 does not strike or collide against the roller 84. More particularly, the P-ECU 106 stops the rotation of the P-lock drive motor 68 before the non-P position wall 94 reaches a position to strike against the roller 84. This position will be referred to as a "non-P target rotational position". In addition, when the roller 84 moves away from the non-P position 90 to the P position 92, the P-ECU 106 controls the P-lock drive motor 68 such that the P wall 96 does not strike or collide against the roller 84. More particularly, the P-ECU 106 stops the rotation of the P-lock drive motor 68 at a position before the P wall 96 reaches a position to strike against the roller 84. This position will be referred to as a "P target rotational position". With the P-lock drive motor 68 controlled by the P-ECU 106, it becomes possible to remarkably lessen the loads exerted on the components of the P-lock mechanism 66 such as the detent plate 74, the detent spring 82 and the shaft 72 or the like during the switching of the shift position. Reducing the loads enables the P-lock mechanism 66 to be light-weighted and low-cost.

Figure 5:
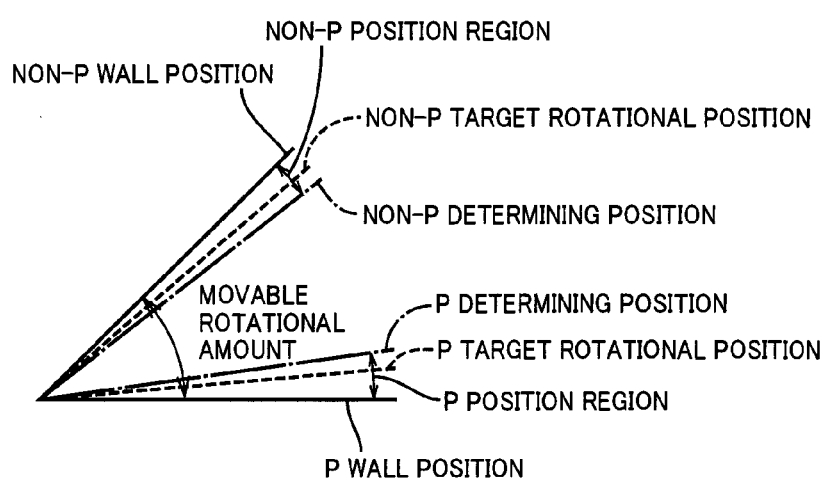
FIG. 5 is a view illustrating the correlation between a rotational amount, i.e., an encoder count of a P-lock drive motor provided with the parking lock device, in the parking lock shown in FIG. 3 and a shifting position.

FIG. 5 is a view illustrating a correlation between the rotational amount of the P-lock drive motor 68, i.e., an encoder count, and the shift position. The P-lock drive motor 68 drivably rotates the detent plate 74, and its rotational amount is restricted by the non-P position wall 94 and the P wall 96. FIG. 5 conceptually shows a position (P wall position) of the P wall 96 and a position (non-P wall position) of the non-P position wall 94 used in controlling the rotation of the P-lock drive motor 68. An area between the P wall position and the non-P wall position will be referred to as a "movable rotational amount" of the P-lock drive motor 68. Further, both of a P determining position and a non-P determining position shown in FIG. 5, are predetermined positions of the detent plate 74 to determine whether to switch the shift position. That is, an area between the P determining position and the P wall position is to a P position region and another area between the non-P determining position and the non-P wall position is to a non-P position region. When the rotational amount of the P-lock drive motor 68 detected by the encoder 70 belongs to the P position region, it is determined that the shift position belongs to the P position. When the rotational amount of the P-lock drive motor 68 belongs to the non-P position region, it is determined that the shift position belongs to the non-P position. Moreover, when the rotational amount of the P-lock drive motor 68 belongs to a region between the P determining position and the non-P determining position, then, it is determined that the shift position is uncertain or the shift position is under the switching state. The determinations described above are executed by the P-ECU 106.

As shown in FIG. 5, further, a P target rotational position is set in the P position region and a non-P target rotational position is set in the non-P position region. The P target rotational position represents a position, at which the P wall 96 does not strike against the roller 84 of the detent spring 82 when the non-P position is switched to the P position, and it is determined to be spaced from the P wall position by a predetermined margin. The predetermined margin is set to have an allowance in consideration of rattle that would be caused by deterioration with age. This absorbs deterioration with age until they are used a certain number of times, thereby avoiding a collision between the P wall 96 and the roller 84 when the shift position is switched from the non-P position to the P position. Likewise, the non-P target rotational position represents a position, at which the non-P wall 94 does not strike against the roller 84 of the detent spring 82 when the P position is switched to the non-P position, and it is determined to be spaced from the non-P wall position by a predetermined margin. The predetermined margin is set to have an allowance in consideration of rattle caused by deterioration with age. This absorbs deterioration with age until they are used a certain number of times, thereby avoiding a collision between the non-P wall 94 and the roller 84 when the shift position is switched from the P position to the non-P position. In addition, the margin with respect to the non-P wall position and the margin with respect to the P wall position do not need to be identical to each other and may be different from each other depending on a shape, etc., of the detent plate 74.

In the parking lock device 16 configured in such a structure, the P-ECU 106 acquires the encoder count depending on the rotational amount of the P-lock drive motor 68, in response to a pulse signal output from the encoder 70. Further, the P-ECU 106 allows encoder counts to be set to zero under a circumstance where, for instance, the switching state of the power supply of the vehicle 10 belongs to the ALL-OFF state or the ACC-ON state whereas when the power supply is switched from the ALL-OFF state or the ACC-ON state to the IG-ON state, the encoder counts are updated in sequence in response to a subsequent signal output from the encoder 70. In the illustrated embodiment, furthermore, the encoder count, occurring when rotated (rotation as shown by an arrow C in FIG. 3) in a direction toward the P wall position, is set to be negative. Moreover, the P-ECU 106 controls the P-lock drive motor 68 such that the acquired encoder count matches a predetermined target encoder count (a target encoder count value and a target count value). The target count value is a target value that is preliminarily determined on experimental tests so as to stop for instance the P-lock drive motor 68 at the P target rotational position and the non-P target rotational position.

In the foregoing, the correlation between the rotational amount of the P-lock drive motor 68 and the shift position has been described. Meanwhile, the encoder 70 is a relative position sensor and when the P-ECU 106 belongs to the non-running state, information of an absolute position, i.e., information on the P-wall position and the non-P position, of the P-lock drive motor 68 is lost. Thus, there is a need to obtain the absolute position of the P-lock drive motor 68 when the P-ECU 106 is switched from the non-running state to the running state. Hereunder, detailed description will be provided of a method of performing a positional control of the P-lock drive motor 68 using an encoder 70 configured to detect relative positional information.

Figure 6:
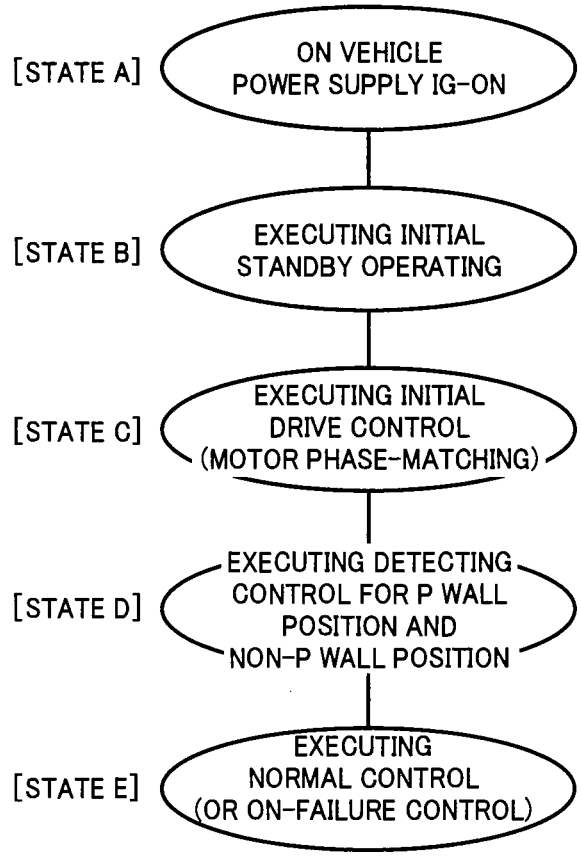
FIG. 6 is a state transition diagram illustrating a series of initial controls to be executed in the parking lock device when a switching state of a power supply of the vehicle shown in FIG. 1 is switched from ALL-OFF state or ACC-ON state to IG-ON state and a P-ECU is switched from non-running state to running state.

FIG. 6 is a state transition diagram for illustrating a series of initial controls to be executed in the parking lock device 16 when the switching state of the power supply of the vehicle 10 is switched from the ALL-OFF state or the ACC-ON state to the IG-ON state and the P-ECU 106 is switched from the non-running state to the running state. In FIG. 6, when the switching state of the power supply of the vehicle 10 is switched from the ALL-OFF state or the ACC-ON state to the IG-ON state by the PM-HV-ECU 104 (referred as "state A"), the P-ECU 106 is switched from the non-running state to the running state and the P-ECU 106 executes an initial standby operation (referred as "state B") for a waiting period in which a relay of the P-lock drive motor 68 is connected. Under such a "state B" for instance the P-ECU 106 performs an initial processing thereof. Subsequently, the P-ECU 106 executes an initial drive control (referred as "state C") including excitation-matching (phase-matching) etc. of the P-lock drive motor 68 for appropriately controlling the rotation thereof. Consecutively, the P-ECU 106 detects the P wall position and the non-P wall position of the P-lock drive motor 68 for setting a reference position (referred as "state D"). After the reference position is set, the P-ECU 106 executes a normal control (referred as "state E") for activating and canceling parking lock depending on the P switch 34 being operated by for instance a user. Under such a normal control, the switching position of the parking lock device 16 is switched to the lock position or the unlock position in response to the pulse signal delivered from the encoder 70. In this moment, it is conceived that the P-ECU 106 is likely to be impossible to have the pulse signal due to some reasons such as failures occurred in the encoder 70 or disconnection caused in a communication cable. Under such a situation with the P-ECU 106 having no pulse signal, the P-ECU 106 performs an on-failure control (referred as "state E") for the P-lock drive motor 68 in place of executing the normal control of the P-lock drive motor 68. In such control, the P-lock drive motor 68 is driven for a time interval sufficient to switch between the lock position and the unlock position such that the parking lock is activated or released in response to the operation of the P-switch 34 or the shift operation. Hereunder, description will be provided of a control method of detecting the P wall position and the non-P wall position under the "state D" described above.

Figure 7:
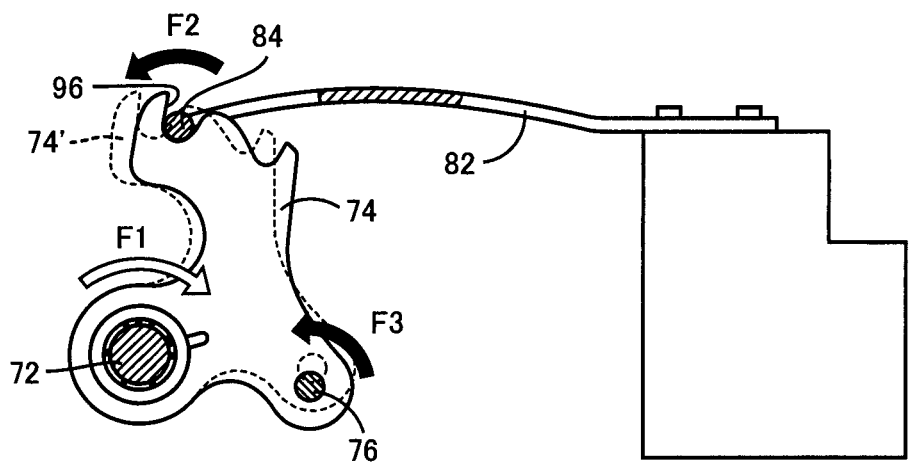
FIG. 7 is a view illustrating a control method of detecting a P wall position, in a P-wall position detecting control executed by the P-ECU shown in FIG. 1.

FIG. 7 is a view illustrating the control method of detecting the P wall position. In a P-wall position detecting control, first, the P-ECU 106 drives the P-lock drive motor 68 to rotate the detent plate 74 in the direction as shown by the arrow C in FIG. 3, i.e., in a direction to move the P wall 96 toward the roller 84 of the detent spring 82 such that the roller 84 and the P wall 96 are brought into contact with each other. The P wall 96 functions as a restricting member in the P position 92, i.e., in the P position of a predetermined shift position, for restricting the rotation of the P-lock drive motor 68 in the direction as shown by the arrow C in FIG. 3 corresponding to a predetermined direction. In addition, the P wall 96 may constitute the restricting member in association with the detent spring 82 and the roller 84. In FIG. 7, an arrow F1 indicates a rotational force of the P-lock drive motor 68; an arrow F2 indicates a spring force of the detent spring 82; and an arrow F3 indicates a returning push-back force exerted by the rod 76. The detent plate 74' indicated by a dotted line indicates a position at which the P wall 96 and the roller 84 are brought into contact with each other. Accordingly, detecting a position of the detent plate 74' corresponds to detection of the position of the P wall 96.

Even after the P wall 96 and the roller 84 are brought into contact with each other, the detent plate 74 is rotated from a position indicated by the dotted line in the direction indicated by the arrow C in FIG. 3, against the tensional force of the detent spring 82 due to the rotational force F1 of the P-lock drive motor 68. This causes the detent spring 82 to flex, so that the spring force F2 is increased and the returning push-back force F3 by the rod 76 is increased. The detent plate 74 is halted in rotation when the rotational force F1 balances with the spring force F2 and the returning push-back force F3.

The P-ECU 106 determines in response to the acquired encoder count if the detent plate 74 is halted in rotation. For instance, the P-ECU 106 determines that the detent plate 74 and the P-lock drive motor 68 are halted in rotation when no variation occurs in a minimal value or a maximal value of the encoder count for a predetermined period of time. Monitoring the minimal value or the maximal value of the encoder count may be determined depending on the encoder 70. Anyway, a state under which no variation takes place in the minimal value or the maximal value for the predetermined period of time represents halt of the detent plate 74 in movement.

The P-ECU 106 detects a position of the detent plate 74 halted in rotation as a provisional P-wall position (hereinafter referred to as a "provisional P wall position") and further calculates a flexing amount or a flexing angle of the detent spring 82. The flexing amount or the flexing angle are calculated using a map, representing the relationship between a voltage applied to the P-lock drive motor 68, and the flexing amount or the flexing angle associated therewith preliminarily stored in for instance the P-ECU 106. The P-ECU 106 calculates the flexing amount or the flexing angle associated with the voltage applied to the P-lock drive motor 68 when the provisional P wall position is detected, by referring to such a map. Further, the map may be of the type using a voltage $V_{BAT}$ of an electric-energy storage device 46 monitored by for instance the P-ECU 106 and easily detected, in place of the applied voltage of the P-lock drive motor 68. In such a case, furthermore, the map is prepared upon taking a voltage drop, caused by a wire harness or the like extending from the electric-energy storage device 46 to the P-lock drive motor 68, into consideration.

The P-ECU 106 corrects the map of the provisional P wall position in terms of the flexing amount or the flexing angle calculated using such a map to fix or to determine the position subjected to the map correction, as the P wall position. Here, the P-ECU 106 sets the encoder count to CNTP for the fixed P wall position. Then, the P-ECU 106 drives the P-lock drive motor 68 such that the encoder count is zeroed to rotate the detent plate 74 in a direction as indicated by an arrow D in FIG. 3, i.e., in a direction to move the P wall 96 away from the roller 84 of the detent spring 82 to place the detent plate 74 at a predetermined P position. The predetermined P position represents a predetermined position that is preset in the P position region and is set such that a difference of the encoder count between the predetermined position and the determined P wall position is CNTP. Further, this predetermined P position may be set as the P target rotational position. Thus, the P wall position is fixed by which the P target rotational position can be set. Instead of using the map representing the relationship between the voltage applied to the P-lock drive motor 68 and the flexing amount or the flexing angle associated therewith, a map may be of the type representing the relationship between the output torque of the P-lock drive motor 68 and the flexing amount or the flexing angle associated therewith. Instead of performing calculation using the map, a sensor for detecting the flexing amount or the flexing angle may be provided to detect such parameters.

Figure 8:
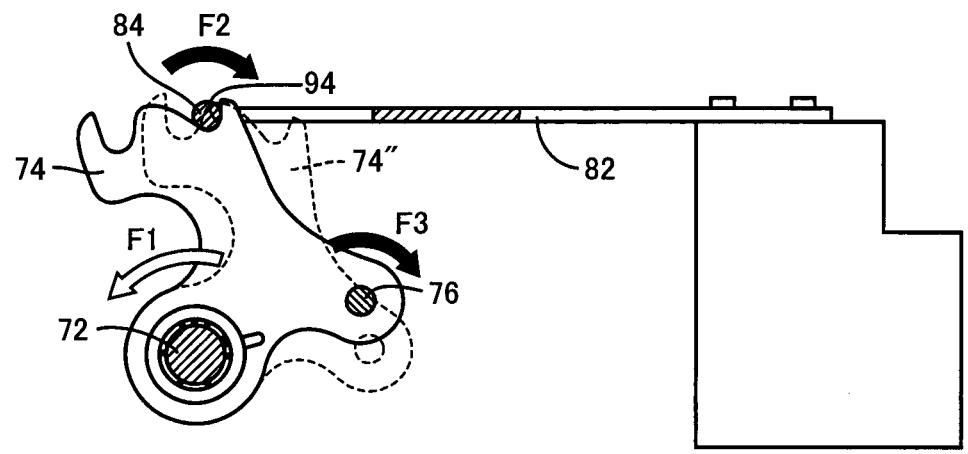
FIG. 8 is a view illustrating a control method of detecting a non-P wall position, in a non-P wall position detecting control executed by the P-ECU shown in FIG. 1.

FIG. 8 is a view illustrating the control method of detecting the non-P wall position. In a non-P wall position detecting control, first, the P-ECU 106 drives the P-lock drive motor 68 to rotate the detent plate 74 in the direction as shown by the arrow D in FIG. 3. That is, the detent plate 74 is rotated such that the non-P wall 94 rotates in a direction to be close to the roller 84 of the detent spring 82 until the roller 84 and the non-P wall 94 are brought into contact with each other. The non-P wall 94 functions as a restricting member in the non-P position 90, i.e., the non-P position of a predetermined shift position, for restricting the rotation of the P-lock drive motor 68 in the direction as shown by the arrow D in FIG. 3 corresponding to a predetermined direction. In addition, the non-P wall 94 may constitute the restricting member together with the detent spring 82 and the roller 84. In FIG. 8, an arrow F1 indicates the rotational force of the P-lock drive motor 68; an arrow F2 indicates the spring force of the detent spring 82; and an arrow F3 represents the tensional force exerted by the rod 76. The detent plate 74" indicated by a dotted line indicates a position at which the non-P wall 94 and the roller 84 are brought into contact with each other. Accordingly, detecting the position of the detent plate 74" corresponds to detection of the position of the non-P wall 94.

After contact between the non-P wall 94 and the roller 84, the detent plate 74 is rotated, due to the rotational force F1 of the P-lock drive motor 68, from a position indicated by the dotted line in a direction indicated by the arrow D in FIG. 3 against the tensional force of the detent spring 82. This causes the detent spring 82 to flex, so that the spring force F2 is increased and the returning push-back force F3 by the rod 76 is increased. The detent plate 74 is halted in rotation when the rotational force F1 balances with the spring force F2 and the returning push-back force F3.

The P-ECU 106 determines in response to the acquired encoder count if the detent plate 74 is halted in rotation. For instance, the P-ECU 106 determines that the detent plate 74 and the P-lock drive motor 68 are halted in rotation when no variation occurs in the minimal value or the maximal value of the encoder count for the predetermined period of time.

The P-ECU 106 detects the position of the detent plate 74 remained halted in rotation as a provisional non-P wall position (hereinafter referred to as a "provisional non-P wall position") and further calculates an extension amount of the detent spring 82. The extension amount is calculated using a map representing the extension amount related in terms of the voltage applied to the P-lock drive motor 68 and being stored in for instance the P-ECU 106. The P-ECU 106 calculates the extension amount of the detent spring 82 corresponding to the voltage applied to the P-lock drive motor 68 by referring to such a map when the provisional non-P wall position is detected.

The P-ECU 106 corrects a map or performs a map correction of the provisional non-P wall position in terms of the extension amount, calculated using such a map, to fix or determine the position subjected to the map correction, to be the non-P wall position. Here, the P-ECU 106 sets the encoder count to CNTCP in the fixed non-P wall position. Then, the P-ECU 106 drives the P-lock drive motor 68 to rotate the detent plate 74 in the direction as indicated by the arrow C in FIG. 3, i.e., in a direction to move the non-P wall 94 away from the roller 84 of the detent spring 82 to place the detent plate 74 at a predetermined non-P position. Thus, the encoder count is set to an encoder count CP in which the encoder count is subtracted by a predetermined count value. The predetermined non-P position represents a predetermined position, preliminarily set to the non-P position region, and is set such that a difference of the encoder count between the predetermined non-P position and the determined non-P wall position lies at a predetermined count value. Further, the predetermined non-P position may be set as the non-P target rotational position. Thus, fixing the non-P wall position enables the non-P target rotational position to be set. In place of using the map representing the extension amount related in terms of the applied voltage, the map may be of the type representing the extension amount related in terms of output torque of the P-lock drive motor 68. Instead of performing the calculation using the map, a sensor for detecting the extension amount may be provided to detect such a parameter.

Under the running state of the P-ECU 106 with the switching state of the vehicle power supply remained in the IG-ON state, thus, the P-lock drive motor 68 is caused to move in the direction to restrict the movement (rotation) thereof. Here, the wall position of the P-lock drive motor 68 associated with the predetermined shift position is detected on the basis of the acquired encoder count, upon which the reference position can be set.

Figure 9:
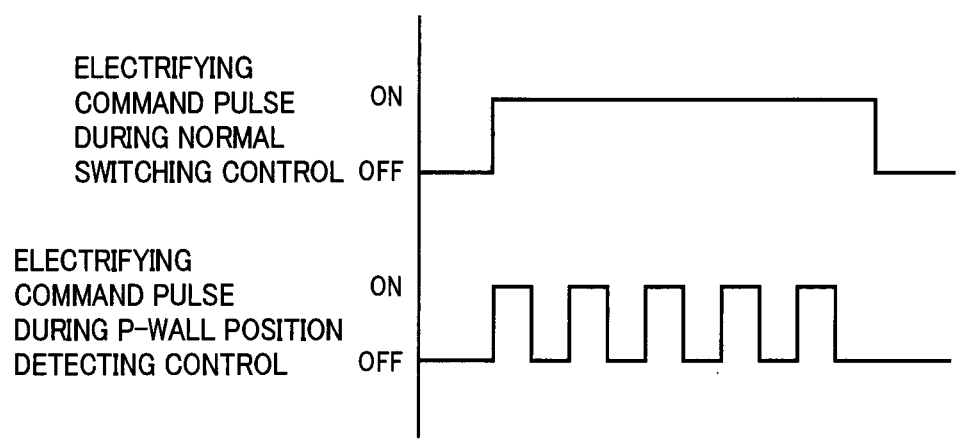
FIG. 9 is a view illustrating waveforms of electrifying command pulses applied to the actuator (P-lock drive motor).

FIG. 9 is a view illustrating waveforms of electrifying command pulses applied to the P-lock drive motor 68. During the normal control to switch the shift position, a signal having a long period with a high level is applied as an electrifying command pulse to the P-lock drive motor 68. During the P-wall position detecting control executed by the P-ECU 106, in contrast, another signal is applied as an electrifying command pulse to the P-lock drive motor 68. This signal allows the P-lock drive motor 68 to provide an output per unit time at a rate less than an output per unit time of the P-lock drive motor 68 during the normal control of switching the shift position. More particularly, the electrifying command pulse applied to the P-lock drive motor 68 has a decreased turn-on width. Decreasing the rotational speed of the P-lock drive motor 68 during the wall position detecting control enables a reduction of an impact between the wall (non-P position wall 94, P wall 96) and the roller 84. In addition, for instance, when the electrifying command pulse shown in FIG. 9 is turned on and an electrifying command for UVW three phases of the P-lock drive motor 68 are turned on, respective UVW three-phase are electrified.

As mentioned above, during the operation to switch the switching state of the vehicle power supply to the IG-ON state, i.e., when the P-ECU 106 is switched from the non-running state to the running state, the initial processing are executed for the P-ECU 106 per se. Thereafter, the initial control for the parking lock device 16 is executed under the running state of the P-ECU 106, upon which the wall position is detected. That is, the initial drive control of the P-lock drive motor 68 is executed as the initial control of the parking lock device 16. Subsequently, the P wall position and the non-P wall position of the P-lock drive motor 68 are detected, upon which the reference position is set. That is, an actually movable rotational amount (an amount within which the P-lock drive motor 68 can actually move) of the P-lock drive motor 68 being based on the detected P wall position and the detected non-P wall position laying in an area between the two wall positions, can be measured by executing the wall position detecting control for one of the shift positions to detect one wall position and subsequently executing the wall position detecting control for the other one of the shift position to detect the other wall position. Then, detecting the wall positions enables an absolute position of the P-lock drive motor 68 to be grasped, so that the target rotational position can be set. After the wall position detecting control for one of the shift positions has been executed, the wall position detecting control for the other one of the shift position may be immediately executed. In the present embodiment, however, for shortening a time interval in transition from the "state A" to the "state E" in FIG. 6, the P-ECU 106 executes the wall position detecting control for one of the shift positions, and then move to the "state E" in FIG. 6 (the normal control or the on-failure control). Further, when the P-release switching request signal or the P-lock switching request signal is received from the PM-HV-ECU 104, the P-ECU 106 alters the switching position of the parking lock device 16 and executes the wall position detecting control for the other one of the shift position.

Figure 10:
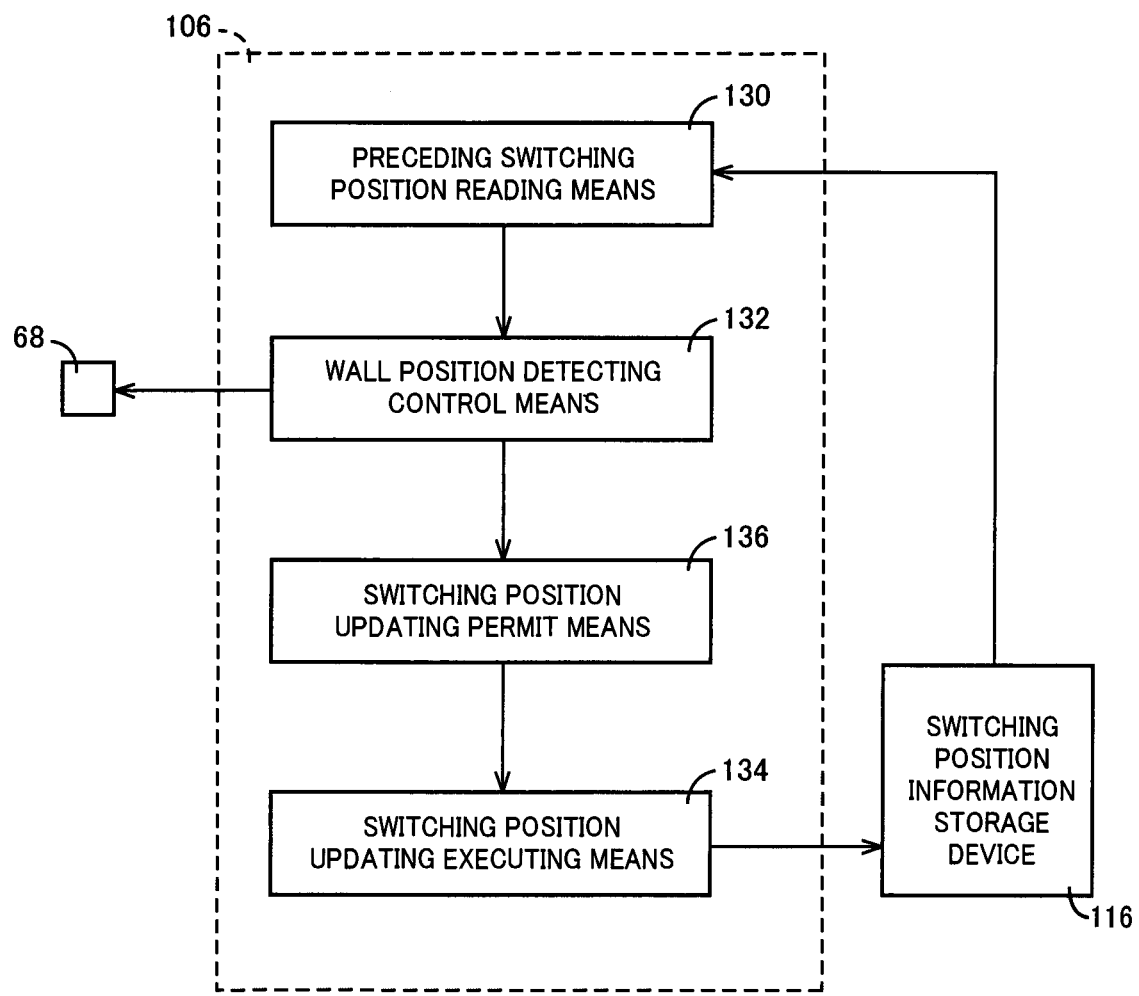
FIG. 10 is a functional block diagram for illustrating an essential part of control functions provided in a shift control device (the P-ECU) shown in FIG. 1.

FIG. 10 is a functional block diagram for illustrating an essential part of control functions provided in the P-ECU 106. As shown in FIG. 10, the P-ECU 106 includes preceding switching position reading means 130, wall position detecting control means 132, switching position updating execution means 134 and switching position updating permit means 136.

When the P-ECU 106 is switched from the non-running state to the running state, the preceding switching position reading means 130 reads switching position information, indicative of the switching position (lock position or unlock position) of the parking lock device 16, which has been previously stored in the switching position information storage device 116 in time before the non-running state is switched to the running state. When the P-ECU 106 is switched to the running state, for instance, the switching position information is immediately stored. The switching position information storage device 116 stores three kinds of switching position information to be read that includes switching position information representing the parking lock device 16 belonging to the lock position, switching position information representing the parking lock device 16 belonging to the unlock position or switching position information representing the switching position of the parking lock device 16 assumed to be uncertain (unclear). The switching position to be uncertain (unclear) may refer to, for instance, a situation under which a rotational amount of the P-lock drive motor 68 belongs to a value between a P-determining position and a non-P-determining position or a situation under which none of the P-determining position and the non-P-determining position is detected.

After when the P-ECU 106 is switched from the non-running state to the running state and the initial drive control of the P-lock drive motor 68 is completed, i.e., after entering the "state D" of FIG. 6, that is, when the driver (user) to execute the operation (run-enable operation) of the vehicle 10 for the run-enable state (REDY-ON state) and the P-ECU 106 is switched from the non-running state to the running state, the wall position detecting control means 132 executes the P-wall position detecting control and the non-P wall position detecting control by driving the P-lock drive motor 68 in response to the switching position information read by the preceding switching position reading means 130. Such controls may be executed in different orders depending on switching position information that has been read in.

Description will be made of a case wherein switching position information, read by the preceding switching position reading means 130, indicates the lock position (P position) of the parking lock device 16. In this case, the wall position detecting control means 132 executes the P-wall position detecting control at first for thereby detecting the P-wall position for storage. Next, a transition occurs from the "state D" to the "state E" in FIG. 6. When the P-ECU 106 receives the P-release switching request signal from the PM-HV-ECU 104, for instance, when the user executes the shift operation to cause the shift position to be switched from the P position to "R", "N" or "D" position, the wall position detecting control means 132 allows the shift position to be switched to the non-P position while executing the non-P wall position detecting control. This results in detection of the non-P wall position for storage while measuring an actually movable rotational amount of the P-lock drive motor 68 for storage. However, if the actually movable rotational amount of the P-lock drive motor 68 has been already detected, no non-P wall position detecting control is executed.

Next, description will be made of a case in which switching position information, read by the preceding switching position reading means 130, indicates the unlock position (non-P position) of the parking lock device 16. In this case, the sequence of operations to be executed is opposite to those of the case in which the lock position is indicated. That is, in this case, the wall position detecting control means 132 executes the non-P wall position detecting control at first for thereby detecting the non-P wall position for storage. Then, a transition occurs from the "state D" to the "state E" in FIG. 6. When the P-ECU 106 receives the P-lock switching request signal from the PM-HV-ECU 104, for instance, when the user executes the shift operation to cause the shift position to be switched from the "R", "N" or "D" position to the P position. In such a case, the wall position detecting control means 132 allows the shift position to be switched to the P position while executing the P-wall position detecting control. This results in detection of the P-wall position for storage while measuring the actually movable rotational amount of the P-lock drive motor 68 for storage. However, if the actually movable rotational amount of the P-lock drive motor 68 has been already detected, no P-wall position detecting control is executed.

Next, description will be made of a case wherein switching position information, read by the preceding switching position reading means 130, indicates that the switching position of the parking lock device 16 is uncertain. In this case, first, the PM-HV-ECU 104 determines whether a current shift position belongs to the P position or the non-P position depending on the vehicle speed V. If, for instance, the detected vehicle speed V belongs to a low vehicle speed equal to or less than a predetermined P-position determining vehicle speed that is preliminarily set to be in the order of 3 km/h on experimental tests, it is determined that the current shift position belongs to the P position. On the contrary, if the detected vehicle speed V belongs to a medium-high vehicle speed higher than the P-position determining vehicle speed, it is determined that the current shift position belongs to the non-P position. Thereafter, if the PM-HV-ECU 104 determines that the current shift position belongs to the P position, the wall position detecting control means 132 executes the non-P wall position detecting control after executing the P wall position detecting control like the case wherein switching position information, read by the preceding switching position reading means 130, indicates that the parking lock device 16 belongs to the lock position (P position). Meanwhile, if the PM-HV-ECU 104 determines that the current shift position belongs to the non-P position, the wall position detecting control means 132 executes the P wall position detecting control after executing the non-P wall position detecting control like the case wherein switching position information, read by the preceding switching position reading means 130, indicates that the parking lock device 16 belongs to the unlock position (non-P position). Under such a situation wherein switching position information, read by the preceding switching position reading means 130, indicates that the switching position of the parking lock device 16 remains to be uncertain, a need arises for the PM-HV-ECU 104 to determine the current shift position based on the vehicle speed V in comparison to the case where relevant switching position information indicates the lock position or unlock position. This results in an increase in the amount of communication between the PM-HV-ECU 104 and the P-ECU 106 with a resultant increase in a time interval required for completing the wall-position detecting control for an object to be executed at first time between the P-wall position detecting control and the non-P wall position detecting control.

If the P-ECU 106 is switched from the non-running state to the running state, then, the switching position updating execution means 134 writes the current switching position of the parking lock device 16 into the switching position information storage device 116, i.e., updates switching position information stored in the switching position information storage device 116. This is completed after the preceding switching position reading means 130 reads switching position information delivered from the switching position information storage device 116. The switching position updating execution means 134 may update switching position information each time, for instance, the parking lock device 16 has switched the switching position. In the illustrated embodiment, however, the updating are repeatedly executed at predetermined extremely short intervals each during a period in which the P-ECU 106 is placed in the running state. With the switching position updating execution means 134 repeatedly performing updating of switching position information in such a way, the switching position information storage device 116 is stored with switching position information for the P-ECU 106 to be switched from the running state to the non-running state. More particularly, switching position information, present immediately before the running state is switched to the non-running state, is stored. However, the switching position updating execution means 134 updates switching position information stored in the switching position information storage device 116 subject to the presence of an updating permit obtained from the switching position updating permit means 136. Further, when none of the P-wall position detecting control and the non-P wall position detecting control has been executed even if the P-ECU 106 is switched from the non-running state to the running state, then, the switching position updating execution means 134 is hard to determine the current switching position of the parking lock device 16 and recognizes that such a switching position is uncertain (unclear). In addition, if the P-wall position detecting control or the non-P wall position detecting control is executed, it becomes possible to recognize that the current switching position of the parking lock device 16 belongs to the lock position or the unlock position.

With the switching position updating execution means 134 operating to update switching position information in the switching position information storage device 116 in such a way, switching position information, read by the preceding switching position reading means 130 from the switching position information storage device 116, represents the switching position of the parking lock device 16 on a stage immediately before the P-ECU 106 is brought into the preceding non-running state, i.e., the initial switching position of the parking lock device 16 on an early stage in which the P-ECU 106 is turned into the running state. Accordingly, since the initial switching position is recognized by the wall position detecting control means 132 and the switching position updating execution means 134, i.e., recognized by the P-ECU 106, the wall-position detecting control, which is initially executed between the P-wall position detecting control and the non-P wall position detecting control that are executed by the wall position detecting control means 132 in sequence, can be said to be a switching position recognizing control for the initial switching position to be recognized. If such a switching position recognizing control, i.e., the wall position detecting control to be executed first, is not executed, the P-ECU 106 cannot recognize the initial switching position and switch the switching position of the parking lock device 16 in accordance with an operation of the user. Thus, strictly speaking, in order for the vehicle 10 to belong to the run-enable state (READY-ON state), there is a need for the switching position recognizing control to be executed, i.e., for the state to be transit to the "state E" in FIG. 6.

The switching position updating permit means 136 determines whether the switching position recognizing control is executed by the wall position detecting control means 132. In other words, the operation is executed to determine whether the transition occurred from the "state D" to the "state E" in FIG. 6. Then, the switching position updating permit means 136 permits the switching position updating execution means 134 to update switching position information stored in the switching position information storage device 116 subjected to the switching position recognizing control being executed.

Figure 11:
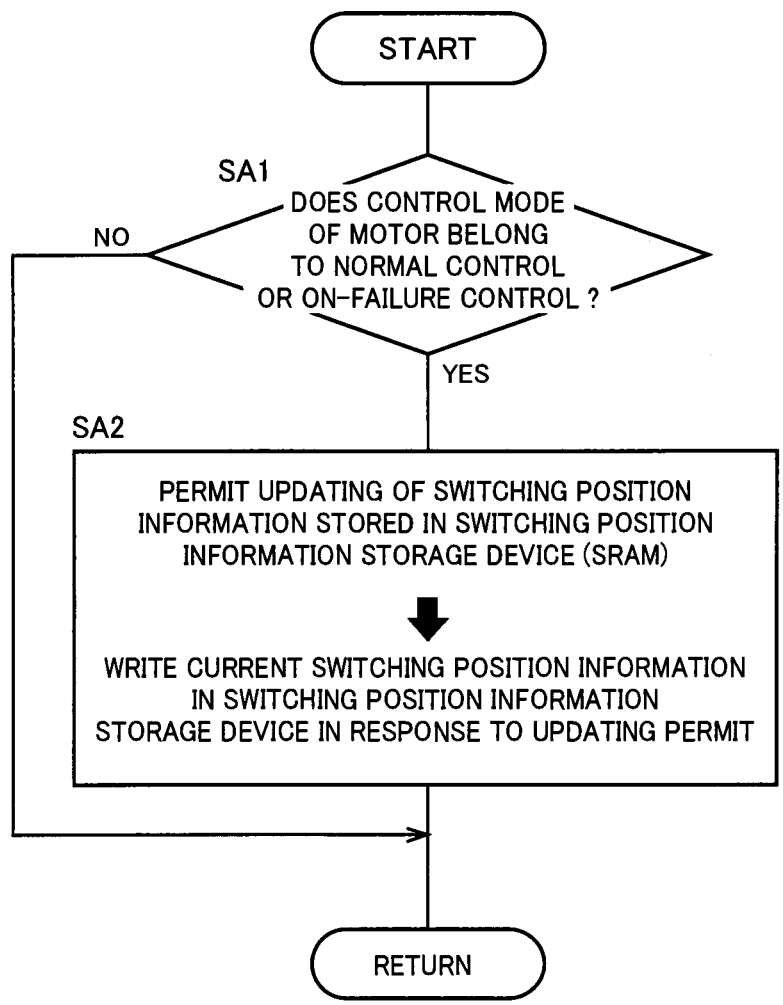
FIG. 11 is a flow chart illustrating an essential part of control operations to be executed by the P-ECU shown in FIG. 10, i.e., the control operation of the parking lock device for updating switching position information stored in a switching position information storage device.

FIG. 11 is a flow chart illustrating an essential part of control operations to be executed by the P-ECU 106, i.e., the control operation of the parking lock device 16 for updating switching position information stored in the switching position information storage device 116. This flowchart is repeatedly executed for an extremely short cycle time in the order of several milliseconds or several tens milliseconds after, for instance, the P-ECU 106 has been switched from the non-running state to the running state.

First, at step (which will be omitted hereinafter) SA1 corresponding to the switching position updating permit means 136, determination is made as to whether the switching position recognizing control is executed. That is, determination is made as to whether the transition occurs in the P-ECU 106 from the "state D" to the "state E" in FIG. 6 such that the control mode of the P-lock drive motor 68 belongs to the normal control or the on-failure control. The presence of the P-lock drive motor 68 remained in the control mode involved in the normal control or the on-failure control reflects that the switching position recognizing control is executed to cause the P-ECU 106 to belong to the "state E" in FIG. 6 and the P-ECU 106 recognizes that the current switching position of the parking lock device 16 is not uncertain (unclear) and belongs to the lock position or the unlock position. If determination at SA1 is positive, i.e., if the switching position recognizing control is executed, the operation goes to SA2. Meanwhile, if determination at SA1 is negative, then, the current flowchart is terminated.

At SA2 corresponding to the switching position updating execution means 134 and the switching position updating permit means 136, the operation is executed to permit the updating of switching position information stored in the switching position information storage device 116. Then, after such updating is permitted, switching position information is repeatedly updated for a predetermined extremely short interval.

In accordance with the present embodiment, as described above, the switching position updating permit means 136 permits the updating of switching position information stored in the switching position information storage device 116 subject to the completion of the wall position detecting control means 132 in execution of the switching position recognizing control. As the P-ECU 106 is switched from the non-running state to the running state, then, the switching position updating execution means 134 updates switching position information stored in the switching position information storage device 116 after receipt of the updating permit on switching position information from the switching position updating permit means 136. Therefore, when the P-ECU 106, functioning as the shift control device of the vehicle 10, is switched from the non-running state to the running state and switched again to the non-running state by, for example, turning off in normal practice without a run-enable operation made by the driver (user) for enabling the vehicle 10 to run, switching position information, stored in the switching position information storage device 116, is not updated since being uncertain. In contrast to a case where switching position information is updated to be uncertain, therefore, in next time of switching of the P-ECU 106 to the running state, that is, when the run-enable operation is made while the P-ECU 106 is turned on in next time, it becomes possible to suppress the occurrence of an increase in time required for the vehicle 10 to become ready to begin to run when the run-enabling operation is executed, for instance, time required for the vehicle 10 to belong to the run-enable state (READY-ON state) since a driver presses the vehicle power source switch 40. As a result, the driver can comfortably begin the running of the vehicle without waiting time. In addition, examples of situations under which the P-ECU 106 is switched from the non-running state to running state and switched again into the non-running state in the absence of the execution of the run-enable operation are deemed to include: a situation under which due to the presence of a user having the electronic key 114 riding on the vehicle 10, the P-ECU 106 is switched from the non-running state to running state for making collation of the electronic key 114 after which the user gets away from the vehicle 10 with the electronic key 114 without taking a motion to execute the run-enable operation; a situation under which the user, having the electronic key 114, rides on the vehicle 10 but no run-enable operation is made with a door left opened with an elapse of a predetermined limit time preset to the order of 30 seconds in advance whereby the P-ECU 106 is switched into the non-running state again; and so on.

In accordance with the present embodiment, further, the switching position updating execution means 134 repeatedly executes the updating of the switching position information, stored in the switching position information storage device 116, within predetermined extremely short intervals during the running state of the P-ECU 106. Thus, when the P-ECU 106 is switched from the non-running state to the running state, the switching position information storage device 116 stores switching position information when the P-ECU 106 is switched from the running state to the non-running state last time, more particularly, switching position information appearing immediately before the preceding non-running state is established. Accordingly, when the P-ECU 106 is set to the running state to recognize the initial switching position of the parking lock device 16, it becomes possible to further eliminate a probability of a discrepancy between switching position information, read by the preceding switching position reading means 130 from the switching position information storage device 116, and a real initial switching position of the parking lock device 16. Throughout a whole of operations of the P-ECU 106 repeatedly switched from the non-running state to the running state, as a result, the P-ECU 106 can more rapidly transit from the "state D" to the "state E" in FIG. 6. This enables the vehicle 10 to more rapidly belong to the run-enable state (READY-ON State). Moreover, the switching position information storage device 116 stores switching position information appearing when the P-ECU 106 is switched from the running state to the non-running state. Since the present invention has an object to allow the wall position detecting control means 132 to more rapidly complete the execution of the switching position recognizing control, it is preferable for such information to be stored in the switching position information storage device 116 although not necessary.

In accordance with the present embodiment, further, the P-ECU 106 can be switched from the non-running state to the running state for the key collating operation for the electronic key that performs wireless communication with the vehicle. This enables the P-ECU 106 to perform a whole of or a part of the key collating operation in charge. This enables the electronic control device 100 to implement the key collating operation in structure, for instance, made of a less number of control devices (the number of ECUs) at low cost than that in which no key collating operation is completed by the P-ECU 106.

While the present invention has been described above with reference to the embodiment shown in the drawings, the present invention may be applied in other various modes.

In the illustrated embodiment noted above, for instance, one of the driver's operations (run-enable operation) to render the vehicle 10 to belong to the run-enable state (READY-ON state) has been exemplified in a mode to press the vehicle power source switch 40 under the brake-on state $B_{ON}$ when the P position is present. However, it doesn't matter if such an operation is replaced or such an operation is performed with other operation to be involved in the run-enable operation described above. A situation can be considered wherein, for instance, to belong to the brake-on state $B_{ON}$ is out of the conditions mentioned above.

In the illustrated embodiment set forth above, furthermore, the situation under which the P-ECU 106 is switched from the non-running state to the running state prior to the execution of the run-enable operation is exemplified to include a case wherein the key collating operation of the electronic key 114 is performed. However, it doesn't matter if under other circumstances, the P-ECU 106 is switched from the non-running state to the running state prior to the execution of the run-enable operation.

In the illustrated embodiment, further, although the shifting lever 32 is of the type that can be switched in operation on a two-dimensional basis, the shifting lever 32 may be of one type that can be switched in operation along one axis, or the other type that can be switched in operation on a three-dimensional basis.

In the illustrated embodiment, furthermore, although the shifting sensor 36 and the select sensor 38 are employed as the position sensors for detecting the position of the shifting lever 32, the number of position sensors is not limited to two.

Moreover, although the shifting lever 32 of the present embodiment described above includes the momentary type lever switch that can be operatively switched to a plurality of shifting positions $P_{SH}$, such a structure may be replaced by for instance a push-button type switch or a slide type switch or the like. In addition, the shifting operation device 30 may not be manually operated but may be operated on a foot. In another alternative, the shifting operation may be executed in response to a voice of a driver. Moreover, although the operation device for switching the shift positions is comprised of the shifting operation device 30 including the shift lever 32 and the P-switch 34, the invention is not limited to such a structure and the operation device may include an operation device by which a shifting will of the driver is converted to an electrical signal. For instance, the operation device may preferably take a structure including operated positions like "P", "R", "N" and "D" etc., corresponding to respective shift positions, a shift lever (operating body) to be operated in such operated positions and operated position sensors operative to electrically detect the shift lever operated in respective operated positions. Such an alternative enables the application of the present invention.

It is intended that the present invention described be considered only as illustrative of one embodiment and that the present invention may be implemented in various modifications and improvements based on knowledge of those skilled in the art.

REFERENCE SIGNS LIST

10: vehicle
14: drive wheels (wheels)
16: parking lock device
68: parking lock drive motor (actuator)
106: P-ECU (shift control device)
116: switching position information storage device

The invention claimed is:

1. A shift control device for a vehicle having a parking lock device driven by an actuator to selectively switch switching positions between a lock position for wheels to be restricted in rotation and an unlock position with no restriction in rotation of the wheels, wherein when a run-enable operation is made by a driver to enable the vehicle to run and when a non-running state is switched to a running state, shift position recognizing control is executed for recognizing an initial switching position appearing at the beginning when the running state is established, by driving the actuator in response to switching position information indicative of the switching position preliminarily stored in a switching position information storage device on a stage before the running state is established, wherein:
   the non-running state is configured to be switched to the running state prior to the execution of the run-enable operation; and
   updating of the switching position information, stored in the switching position information storage device, is permitted to be executed subjected to the switching position recognizing control being executed.

2. The shift control device for the vehicle according to claim 1, wherein:
   when the shift control device is switched to the running state, the switching position information storage device stores the switching position information when the shift control device is switched from the running state to the non-running state last time.

3. The shift control device for the vehicle according to claim 2, wherein:
   a key collating operation for an electronic performs wireless communication with the vehicle is performed by switching the non-running state to the running state.

4. The shift control device for the vehicle according to claim 1, wherein:
   a key collating operation for an electronic key that performs wireless communication with the vehicle is performed by switching the non-running state to the running state.

* * * * *